US012605694B2

(12) United States Patent
Kim et al.

(10) Patent No.: US 12,605,694 B2
(45) Date of Patent: Apr. 21, 2026

(54) SUPER ABSORBENT POLYMER

(71) Applicant: LG Chem, Ltd., Seoul (KR)

(72) Inventors: Kyung Su Kim, Daejeon (KR); Kwang In Shin, Daejeon (KR); Soo Young Kwak, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/985,192

(22) Filed: Dec. 18, 2024

(65) Prior Publication Data

US 2025/0339843 A1 Nov. 6, 2025

(30) Foreign Application Priority Data

May 3, 2024 (KR) ........................ 10-2024-0059076

(51) Int. Cl.
*B01J 20/26* (2006.01)
*B01J 20/28* (2006.01)
*C08F 220/06* (2006.01)

(52) U.S. Cl.
CPC ....... *B01J 20/267* (2013.01); *B01J 20/28004* (2013.01); *B01J 20/28011* (2013.01); *B01J 20/28016* (2013.01); *C08F 220/06* (2013.01); *C08F 2810/20* (2013.01)

(58) Field of Classification Search
CPC .............................. B01J 20/267; C08F 220/06
See application file for complete search history.

(56) References Cited

U.S. PATENT DOCUMENTS 5,338,766 A 8/1994 Phan et al.
6,319,558 B1 11/2001 Willemsen
10,994,260 B2 5/2021 Kovacic et al.
2005/0003191 A1 1/2005 Ehrnsperger et al.
2005/0239942 A1 10/2005 Herfert et al.
2006/0020053 A1 1/2006 Flohr et al.
2007/0264489 A1 11/2007 Sasabe et al.
2008/0021150 A1 1/2008 Becker et al.
2008/0075937 A1 3/2008 Wada et al.
2008/0140037 A1 6/2008 Newman
2010/0216938 A1 8/2010 Becker et al.
2012/0220452 A1 8/2012 Matsumoto et al.
2013/0026412 A1 1/2013 Machida et al.
2013/0102750 A1 4/2013 Watanabe et al.
2013/0136713 A1 5/2013 Terada et al.
2013/0175473 A1 7/2013 Wada et al.
2014/0031203 A1 1/2014 Kondo et al.
2014/0031473 A1 1/2014 Nogi et al.
2015/0299404 A1 10/2015 Daniel et al.
2015/0307681 A1 10/2015 Park et al.
2015/0322180 A1* 11/2015 Matsumoto .............. C08J 3/245 526/317.1
2016/0208035 A1 7/2016 Ryu et al.
2017/0014801 A1* 1/2017 Ikeuchi ................. A61L 15/425
2017/0073478 A1 3/2017 Joo et al.
2017/0189575 A1 7/2017 Lee et al.
2017/0216817 A1 8/2017 Torii et al.
2017/0233534 A1 8/2017 Kim et al.
2017/0312148 A1 11/2017 Dobrosielska-Oura et al.
2018/0021437 A1 1/2018 Kim et al.
2018/0037686 A1 2/2018 Lee et al.
2018/0243464 A1 8/2018 Hwang et al.
2019/0099739 A1 4/2019 Lee et al.
2019/0308171 A1 10/2019 Kim et al.
2019/0344243 A1 11/2019 Lee et al.
2020/0085716 A1 3/2020 Mehling et al.
2020/0139344 A1 5/2020 Kim et al.
2020/0247958 A1 8/2020 Park et al.
2021/0033516 A1* 2/2021 Toennessen ......... G01N 27/043
2021/0040271 A1 2/2021 Lee et al.
2021/0100684 A1 4/2021 Kitabata et al.
2021/0113989 A1 4/2021 Hur et al.
2021/0121852 A1 4/2021 Herfert et al.
2021/0154637 A1 5/2021 Pfeiffer et al.
2021/0244844 A1 8/2021 Chan et al.
2021/0309777 A1 10/2021 Lee et al.
2021/0362126 A1 11/2021 Bauer et al.
2022/0088568 A1 3/2022 Kimura et al.
2022/0184579 A1* 6/2022 Yan ........................ C08F 20/06

(Continued)

FOREIGN PATENT DOCUMENTS

CA 2319786 A1 8/1999
CN 001136355 C 1/2004

(Continued)

OTHER PUBLICATIONS

Shi M, et al., The Development of a Polysaccharide-Based Hydrogel Encapsulating Tobramycin-Loaded Gelatine Microspheres as an Antibacterial System. Gels. Mar. 2023; 9(3):219. <https://doi.org/10.3390/gels9030219.> 15 pgs.
Zhang, et al., Predicting the Swelling Behavior of Acrylic Superabsorbent Polymers Used in Diapers, Advances in Polymer Technology, 2021, 9999826, 7 pages, Dec. 2021. https://doi.org/10.1155/2021/9999826.
International Search Report for Application No. PCT/KR2024/018688 mailed Mar. 7, 2025. 5 pages (see p. 2-4, categorizing the cited references).
International Search Report for Application No. PCT/KR2024/018689 mailed Mar. 7, 2025. 5 pages (see p. 2-4, categorizing the cited references).
International Search Report for Application No. PCT/KR2025/002375 mailed Jun. 2, 2025. 3 pages.
George Odian, “Principles of Polymerization” , Wiley-Interscience, Feb. 2004. 839 pages.

(Continued)

*Primary Examiner* — Liam J Heincer
(74) *Attorney, Agent, or Firm* — Lerner David LLP

(57) ABSTRACT

A polyacrylic acid (salt)-based super absorbent polymer may satisfy Equation 1. In Equation 1, $D_{Sap}$ is a diffusion coefficient of ethanol in the polyacrylic acid (salt)-based super absorbent polymer measured by nuclear magnetic resonance (NMR) spectroscopy, and $D_E$ is a diffusion coefficient of pure ethanol as measured by nuclear magnetic resonance spectroscopy.

$$(D_{Sap}/D_E)\times 100(\%)\leq 92.5(\%) \quad \text{[Equation 1]}$$

10 Claims, 6 Drawing Sheets

(56) References Cited

U.S. PATENT DOCUMENTS

| | | | | |
|---|---|---|---|---|
| 2023/0102961 | A1 | 3/2023 | Nishimura et al. | |
| 2023/0330629 | A1 | 10/2023 | Won et al. | |
| 2023/0338925 | A1 | 10/2023 | Chung et al. | |
| 2023/0347317 | A1 | 11/2023 | Yoon et al. | |
| 2023/0374232 | A1* | 11/2023 | Ryu | C08K 5/098 |
| 2023/0381744 | A1 | 11/2023 | Woo et al. | |
| 2024/0238759 | A1* | 7/2024 | Ryu | C08K 5/098 |
| 2024/0261762 | A1 | 8/2024 | Kim et al. | |
| 2024/0278210 | A1 | 8/2024 | Lee et al. | |
| 2024/0278211 | A1 | 8/2024 | Han et al. | |
| 2024/0351003 | A1 | 10/2024 | Nam et al. | |

FOREIGN PATENT DOCUMENTS

| | | | |
|---|---|---|---|
| EP | 1024176 | A1 | 8/2000 |
| EP | 3270857 | B1 | 12/2019 |
| EP | 4137534 | A1 | 2/2023 |
| EP | 4206244 | A1 | 7/2023 |
| EP | 4253451 | A1 | 10/2023 |
| EP | 4321559 | A1 | 2/2024 |
| EP | 4321561 | A1 | 2/2024 |
| JP | H08-122284 | A | 5/1996 |
| JP | 2001-106728 | A | 4/2001 |
| JP | 2002-504568 | A | 2/2002 |
| JP | 2005097569 | A | 4/2005 |
| JP | 3745539 | B2 | 2/2006 |
| JP | 2006527641 | A | 12/2006 |
| JP | 2007-512405 | A | 5/2007 |
| JP | 2009057496 | A | 3/2009 |
| JP | 4261853 | B2 | 4/2009 |
| JP | 4284767 | B2 | 6/2009 |
| JP | 4908545 | B2 | 4/2012 |
| JP | 2012-097273 | A | 5/2012 |
| JP | WO 2012-144564 | A1 | 7/2014 |
| JP | 5616437 | B2 | 10/2014 |
| JP | 5692844 | B2 | 4/2015 |
| JP | 2015120933 | A | 7/2015 |
| JP | 5913423 | B2 | 4/2016 |
| JP | 2017-531531 | A | 10/2017 |
| JP | 2017185485 | A | 10/2017 |
| JP | 2018-510041 | A | 4/2018 |
| JP | 2021-510320 | A | 4/2021 |
| JP | 6890190 | B2 | 6/2021 |
| JP | 6950158 | B2 | 10/2021 |
| JP | 6959030 | B2 | 11/2021 |
| JP | 7181948 | B2 | 12/2022 |
| JP | 7270828 | B2 | 5/2023 |
| JP | 7362653 | B2 | 10/2023 |
| KR | 100317398 | B1 | 11/2002 |
| KR | 20050036974 | A | 4/2005 |
| KR | 20070039050 | A | 4/2007 |
| KR | 2007-0048226 | A | 5/2007 |
| KR | 20070083761 | A | 8/2007 |
| KR | 2013-0097771 | A | 9/2013 |
| KR | 2014-0063116 | A | 5/2014 |
| KR | 2015-0062959 | A | 6/2015 |
| KR | 2015-0087368 | A | 7/2015 |
| KR | 2015-0143181 | A | 12/2015 |
| KR | 20150142636 | A | 12/2015 |
| KR | 2016-0127742 | A | 11/2016 |
| KR | 101700354 | B1 | 1/2017 |
| KR | 20170020113 | A | 2/2017 |
| KR | 20170033634 | A | 3/2017 |
| KR | 20170063818 | A | 6/2017 |
| KR | 2017-0111295 | A | 10/2017 |
| KR | 101812895 | B1 | 12/2017 |
| KR | 101848470 | B1 | 4/2018 |
| KR | 20180073334 | A | 7/2018 |
| KR | 20180074384 | A | 7/2018 |
| KR | 101908142 | B1 | 10/2018 |
| KR | 101918647 | B1 | 11/2018 |
| KR | 2019-0012809 | A | 2/2019 |
| KR | 2019-0016534 | A | 2/2019 |
| KR | 101989142 | B1 | 6/2019 |
| KR | 20190072406 | A | 6/2019 |
| KR | 102094453 | B1 | 3/2020 |
| KR | 2020-0051565 | A | 5/2020 |
| KR | 20200062012 | A | 6/2020 |
| KR | 20200073044 | A | 6/2020 |
| KR | 2020-0123127 | A | 10/2020 |
| KR | 102322774 | B1 | 11/2021 |
| KR | 2022-0049961 | A | 4/2022 |
| KR | 20220046497 | A | 4/2022 |
| KR | 20220068184 | A | 5/2022 |
| KR | 2022-0088351 | A | 6/2022 |
| KR | 2022-0169431 | A | 12/2022 |
| KR | 2022-0169444 | A | 12/2022 |
| KR | 20220169437 | A | 12/2022 |
| KR | 102568226 | B1 | 8/2023 |
| KR | 20230120110 | A | 8/2023 |
| KR | 102578740 | B1 | 9/2023 |
| KR | 102584470 | B1 | 10/2023 |
| KR | 2024-0014710 | A | 2/2024 |
| WO | 2022108430 | A1 | 5/2022 |
| WO | 2022131838 | A1 | 6/2022 |
| WO | 2022265459 | A1 | 12/2022 |
| WO | 2022265466 | A1 | 12/2022 |
| WO | 2022265472 | A1 | 12/2022 |
| WO | 2022265473 | A1 | 12/2022 |
| WO | 2022265477 | A1 | 12/2022 |

OTHER PUBLICATIONS

International Search Report for Application No. PCT/KR2025/002377 mailed May 26, 2025. 3 pages.

International Search Report for Application No. PCT/KR2025/095022 mailed Jul. 4, 2025. 3 pages.

Menceloglu, Y., et al., "Triblock Superabsorbent Polymer Nanocomposites with Enhanced Water Retention Capacities and Rheological Characteristics", ACS Omega, vol. 7, Issue 24, pp. 20486-20494, Jun. 8, 2022.

Kim, Hae Chan, "Superabsorbent polymer with enhanced gel strength and heat resistance using itaconic acid-based oligomer", Polymers for Advanced Technologies, vol. 34, pp. 2564-2572, Apr. 25, 2023.

Kim, S., et al. Preparation of Surface-Reinforced Superabsorbent Polymer Hydrogel Microspheres via Incorporation of In Situ Synthesized Silver Nanoparticles. Polymers. Mar. 2021; 13(6):902. https://doi.org/10.3390/polym13060902.11 pgs.

Situ, Y, et al., "Synthesis and application of super absorbent polymers synthesized with ammonia solution and diatomaceous earth with low toxic residues" Environmental Technology & Innovation, Octubre 2023, pp. 1-12, vol. 32.

Kwon, Y.R."Surface-crosslinking of itaconic acid-based superabsorbent polymer using a novel bio-based surface- crosslinker based on succinic acid"Polymer-Plastics Technology and Materials, Taylor & Francis, Mar. 2023, pp. 1057-1066, vol. 62, Issue 8.

Sharma, S. et al., " Superabsorbent Polymer Gels based on Polyaspartic Acid and Polyacrylic Acid" Journal of Material Science & Engineering, Feb. 2016, pp. 1-7, vol. 5, Issue 3.

International Search Report for Application No. PCT/KR2025/006678 mailed Aug. 29, 2025, 11 pages.

International Search Report for Application No. PCT/KR2025/006025 mailed Aug. 6, 2025, 13 pages.

International Search Report for Application No. PCT/KR2025/006542 mailed Aug. 27, 2025, 9 pages.

International Search Report for Application No. PCT/KR2025/006675 mailed Aug. 27, 2025, 9 pages.

* cited by examiner

[FIG. 1]
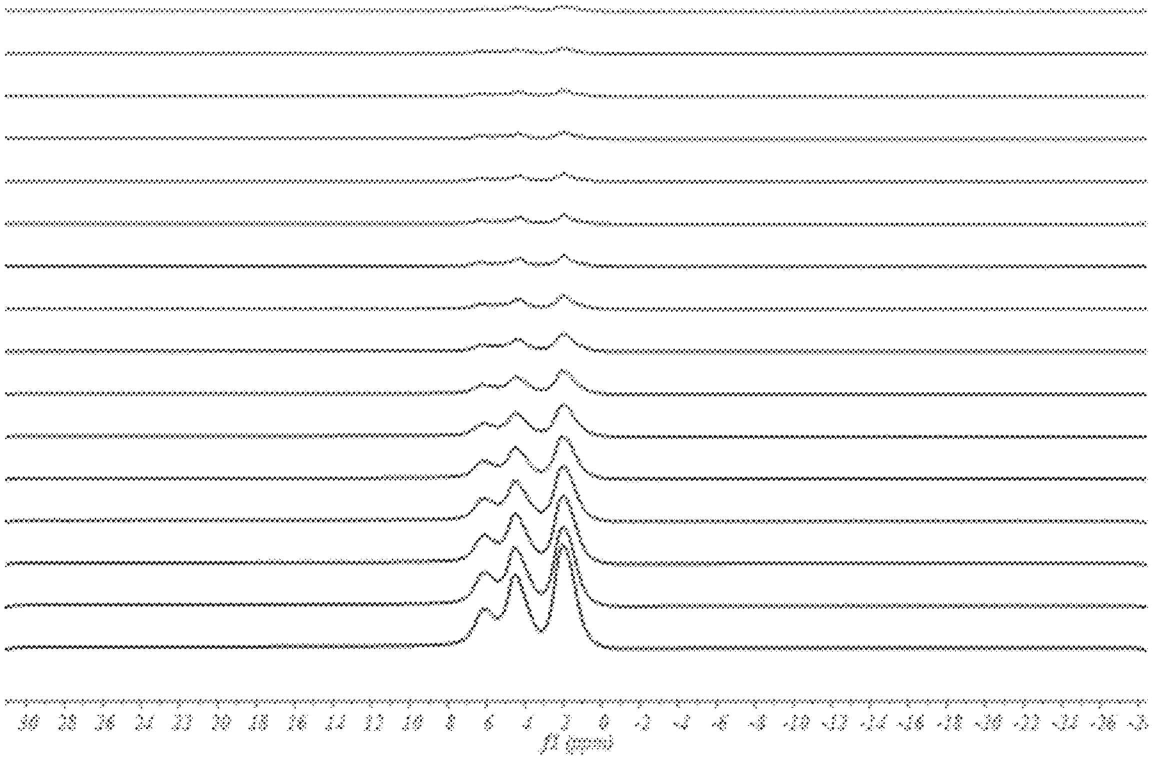

[FIG.2]
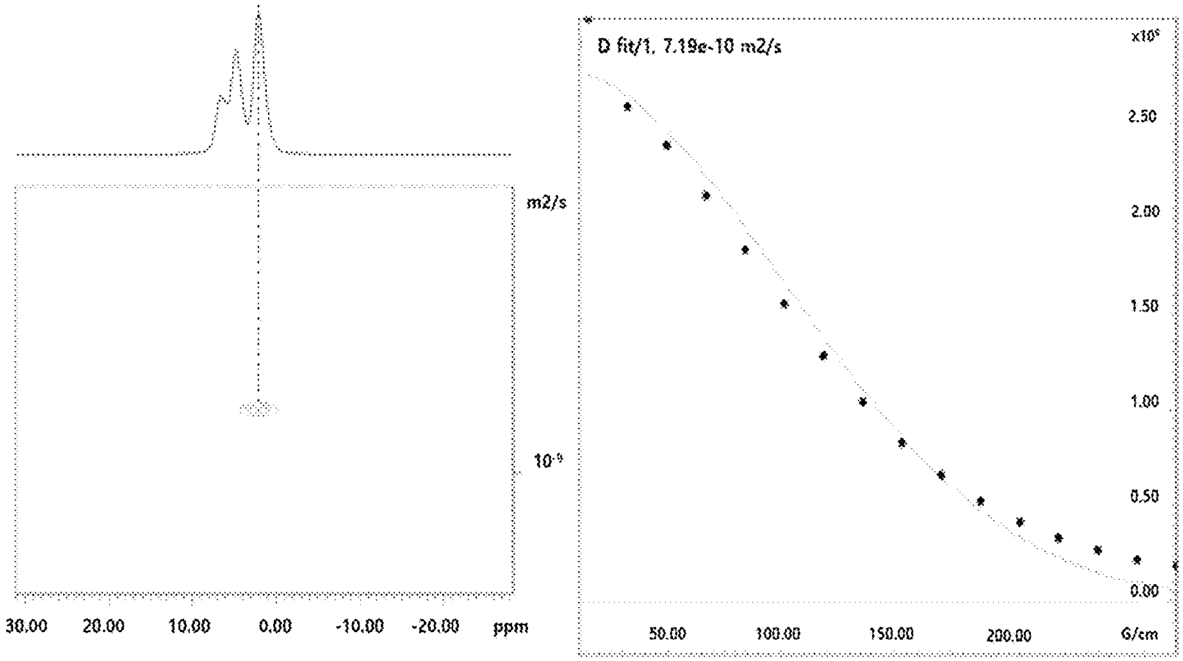

[FIG. 3]
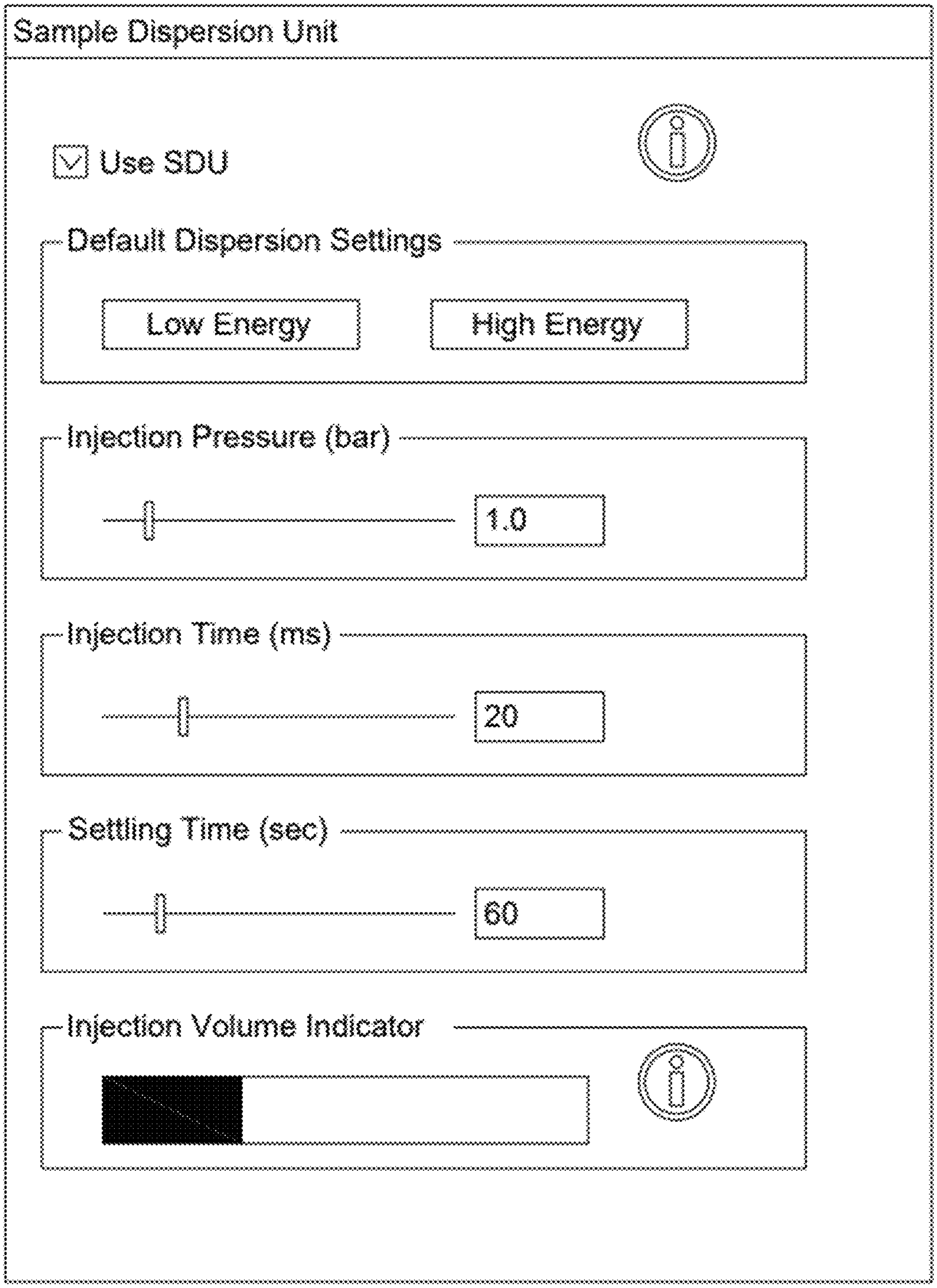

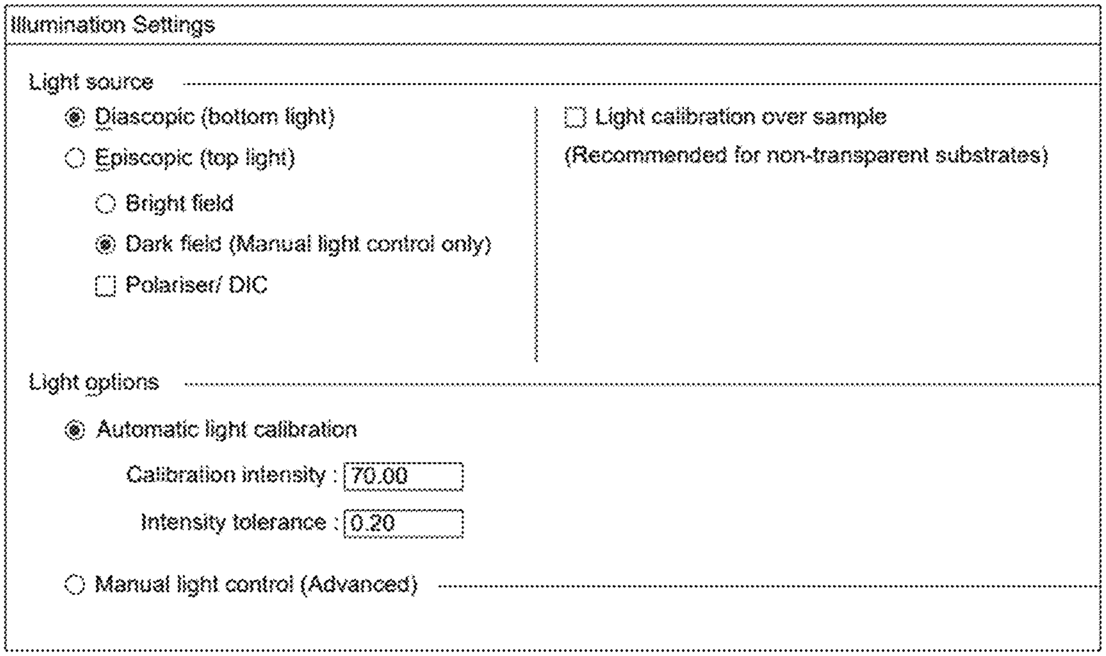
[FIG. 4]
Illumination Settings
Light source
⦿ Diascopic (bottom light)                    ☐ Light calibration over sample
○ Episcopic (top light)                       (Recommended for non-transparent substrates)
   ○ Bright field
   ⦿ Dark field (Manual light control only)
   ☐ Polariser/ DIC
Light options
⦿ Automatic light calibration
   Calibration intensity : [70.00]
   Intensity tolerance : [0.20]
○ Manual light control (Advanced)

[FIG. 5]
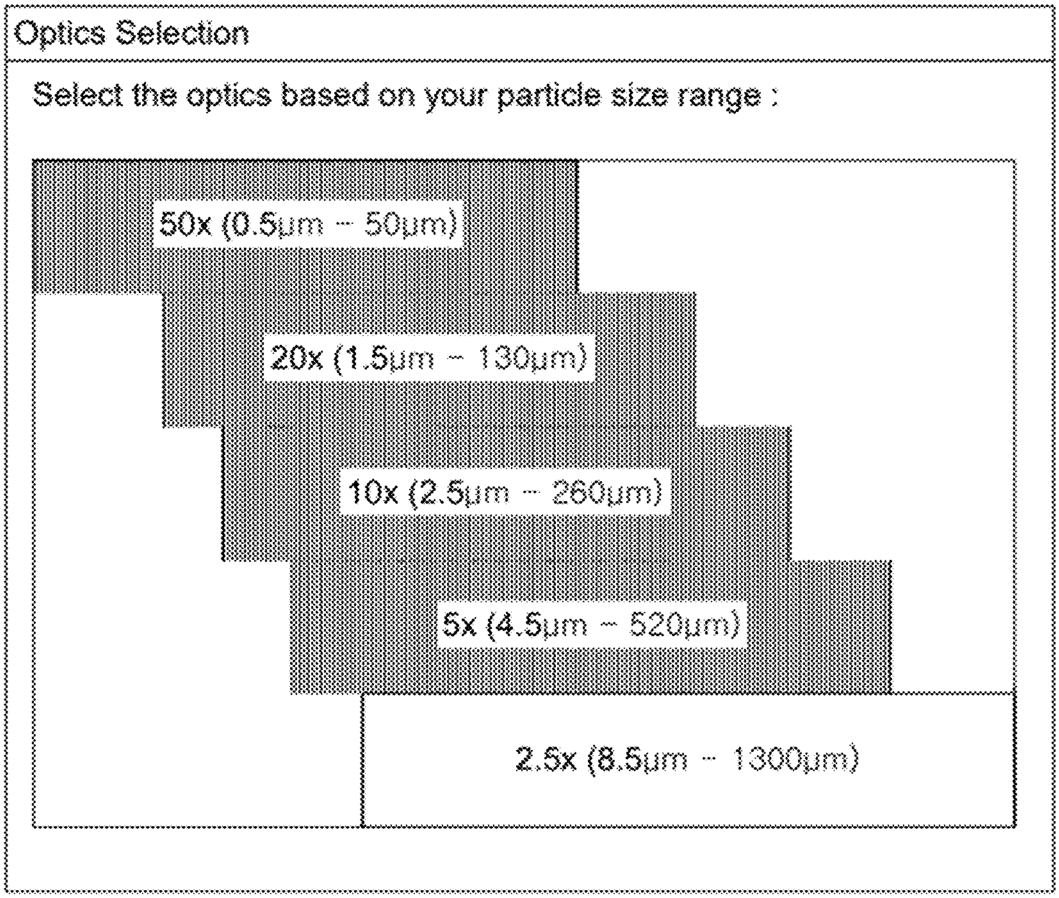

[FIG. 6]
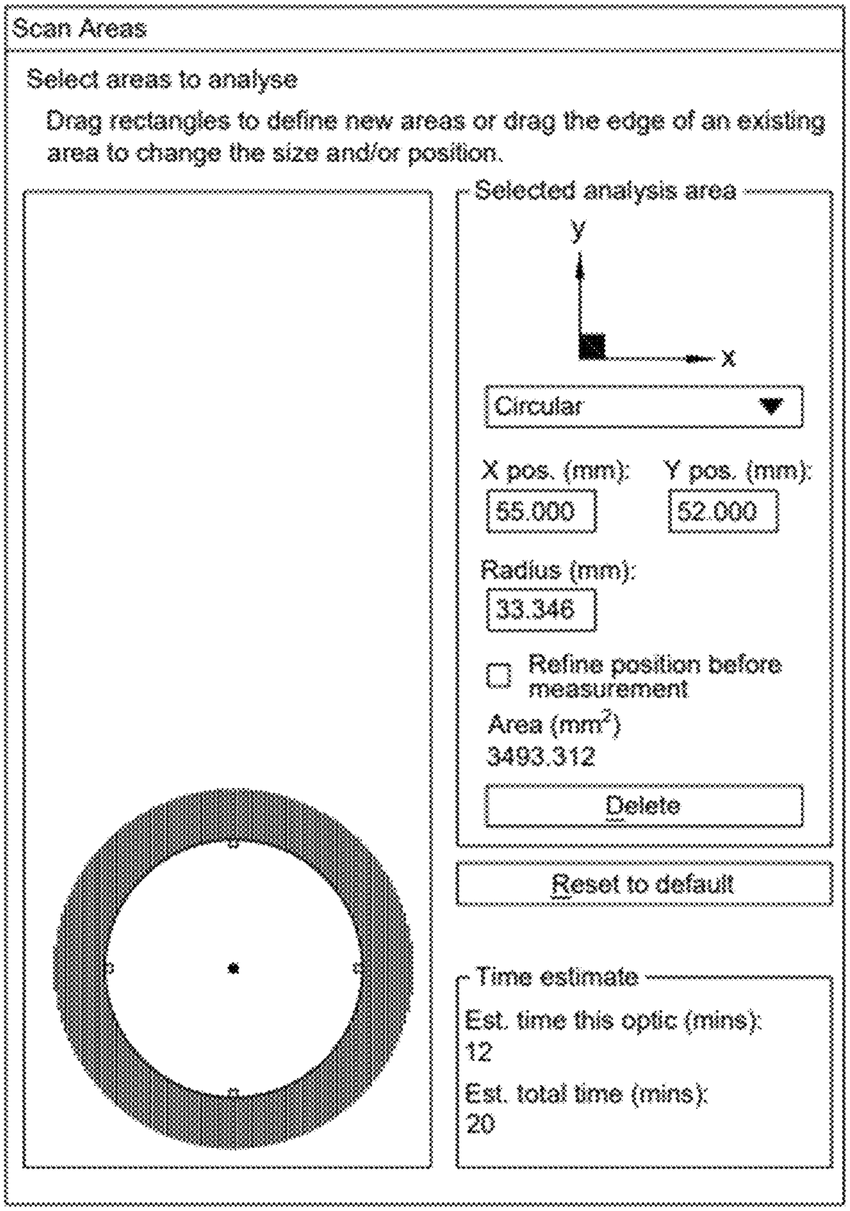

SUPER ABSORBENT POLYMER

CROSS-REFERENCE TO RELATED APPLICATION

This application claims priority to Korean Patent Application No. 10-2024-0059076, filed on May 3, 2024, the disclosure of which is incorporated herein by reference in its entirety.

TECHNICAL FIELD

The present disclosure relates to a super absorbent polymer. More specifically, the present disclosure relates to a super absorbent polymer exhibiting an improved absorption rate and improved absorption performance and a method of preparing the same.

BACKGROUND

A super absorbent polymer (SAP) is a synthetic polymer material that can absorb 500 to 1,000 times its own weight in moisture, and is named differently by each developer, such as super absorbent material (SAM) and absorbent gel material (AGM). The super absorbent polymers described above began to be put to practical use in the sanitary field, such as sanitary products, and are now widely used as soil water retainers for horticulture, water-retaining materials for civil engineering and construction, sheets for raising seedlings, and freshness-preserving agents and materials for steaming in the food distribution industry.

The super absorbent polymer is usually included in a dispersed state within pulp. However, recently, the development of so-called pulpless products, in which the pulp content is reduced or even no pulp is used at all, is being actively pursued in order to provide thinner products.

In this way, in products where the pulp content is reduced or no pulp is used, a relatively high proportion of the super absorbent polymer is included. As a result, super absorbent polymer particles are inevitably included as multiple layers in the product. In order for the overall super absorbent polymer particles included in such a multilayer structure to more efficiently absorb a large amount of liquid such as water, brine, urine, or the like, it is necessary to improve the absorption properties so that the super absorbent polymer basically has not only high absorption performance but also a fast absorption rate.

The most common method for improving these absorption properties is to form a porous structure inside the super absorbent polymer to increase the surface area of the super absorbent polymer. Among these methods, a method of forming a porous structure within the base resin powder by including a foaming agent in the monomer composition to perform crosslinking polymerization is generally adopted.

However, a problem occurred in which overall properties of the super absorbent polymer, such as surface tension, liquid permeability, or bulk density, were reduced depending on the use of the foaming agent. That is, a problem occurred in which it was difficult to maintain the shape in a swollen state. In addition, it had the disadvantage of increasing the amount of fine particles.

Accordingly, there is a continuous demand for the development of super absorbent polymers that can fundamentally solve these problems.

SUMMARY

The present disclosure is directed to providing a super absorbent polymer (SAP) having improved absorption properties by appropriately controlling the numerical value of a diffusion coefficient of ethanol in the SAP to a certain level or lower.

The present disclosure provides a polyacrylic acid (salt)-based super absorbent polymer, the super absorbent polymer satisfying the following Equation 1, $$(D_{Sap}/D_E)\times 100(\%)\leq 92.5(\%) \quad \text{[Equation 1]}$$

In Equation 1, $D_{Sap}$ represents a diffusion coefficient of ethanol in the super absorbent polymer as measured by nuclear magnetic resonance (NMR) spectroscopy, and $D_E$ is a diffusion coefficient of pure ethanol as measured by nuclear magnetic resonance spectroscopy.

BRIEF DESCRIPTION OF THE DRAWINGS

The above and other objects, features and advantages of the present disclosure will become more apparent to those of ordinary skill in the art by describing exemplary aspects thereof in detail with reference to the accompanying drawings, in which:

FIG. 1 is a diagram showing the change in peak intensity measured through a $^1$H DOSY NMR experiment;

FIG. 2 is a diagram showing the process of deriving the diffusion coefficient ($D_{Sap}$) value of ethanol in the super absorbent polymer by fitting the results of FIG. 1;

FIG. 3 shows the setting values of a sample dispersion unit in Morphologi 4 from Malvern Panalytical;

FIG. 4 shows the illumination setting values in Morphologi 4 from Malvern Panalytical;

FIG. 5 shows the optics selection setting values in Morphologi 4 from Malvern Panalytical; and FIG. 6 shows the scan area setting values in Morphologi 4 from Malvern Panalytical.

DETAILED DESCRIPTION

Unless otherwise defined herein, all technical and scientific terms used herein are used for the purpose of describing exemplary aspects only and are not intended to be limiting on the disclosure. Singular expressions include plural expressions unless the context clearly dictates otherwise. In this disclosure, the terms "comprises," "includes," or "has" and the like are intended to designate the presence of the features, numbers, steps, components, or combinations thereof that are implemented, and are not to be understood as precluding the possibility of the presence or addition of one or more other features or numbers, steps, components or combinations thereof.

While aspects of the disclosure are susceptible to various modifications and forms, specific aspects thereof will be exemplified and described in detail below. However, this is not intended to limit the present disclosure to specific aspects, and it should be understood to include all modifications, equivalents and substitutes included in the spirit and scope of the present disclosure.

The terminology used herein is for the purpose of describing particular aspects only and is not intended to limit the disclosure. Also, the singular forms used here include the plural forms unless the phrases clearly indicate a contrary meaning.

The term "polymer" or "high molecular weight molecule" as used here refers to a state in which a water-soluble ethylenically unsaturated monomer is polymerized, and can encompass any moisture content range or particle diameter range.

In addition, the term "super absorbent polymer" is used to mean, depending on the context, a base resin in powder form consisting of a crosslinked polymer or super absorbent polymer particles obtained by pulverizing the crosslinked polymer, or to encompass all products made suitable for commercialization by additional processes, such as drying, pulverizing, classifying, and surface crosslinking, for the crosslinked polymer or the base resin.

In addition, the term "fine particle" refers to a particle having a particle diameter of less than 150 μm among super absorbent polymer particles. At this time, the particle diameter of these polymer particles may be measured according to the European Disposables and Nonwovens Association (EDANA) standard EDANA WSP 220.3 method.

In addition, the term "chopping" refers to cutting the hydrogel polymer into small pieces in millimeter units to increase drying efficiency and is used to differentiate from pulverizing to a micrometer or normal particle size.

In addition, the term "micronizing" or "micronization" refers to pulverizing a hydrogel polymer into particle sizes of tens to hundreds of micrometers and is used to differentiate it from "chopping".

In this disclosure, the "diffusion coefficient of ethanol" is derived through nuclear magnetic resonance (NMR) spectroscopy analysis. NMR is an analysis tool that measures the average value of a sample within the NMR pulse irradiation range, so it is an analysis method that has the advantage of identifying the overall characteristics of the sample.

In this disclosure, there are two cases for measuring the diffusion coefficient of ethanol using NMR: the case of measuring using a super absorbent polymer as a sample ($D_{Sap}$) and the case of measuring without a sample ($D_E$).

1) The method of measuring $D_{Sap}$ is as follows.

① Step 1

The sample, a super absorbent polymer (SAP), was filled to a height of 5 cm in a 5 mm NMR tube. Next, an ethanol solvent was input to the 5 mm NMR tube to a height of 6 cm and shaken for 30 minutes.

② Step 2

$^1H$ DOSY NMR experiments were performed under the following conditions. The following conditions refer to conditions under which a gradual decrease in peak intensity occurs, as shown in FIG. 1. For reference, FIG. 1 is a diagram showing the gradual decrease in peak intensity according to the pulse field gradient.

d1=5, ns=1, pulse=ledbpgp2s, gpz6=1-17, p30=500us, d20=0.05, o1p=5, sw=100 ppm

③ Step 3

The $^1H$ DOSY data obtained by performing a $^1H$ DOSY NMR experiment is fitted to the intensity value change plot by the gradient of the ethanol peak using the fitting software, Dynamics Center v2.5.6, as shown in FIG. 2, to derive the diffusion coefficient ($D_{Sap}$) value of ethanol in the super absorbent polymer. That is, the results of FIG. 1 are fitted as in FIG. 2 to derive the diffusion coefficient ($D_{Sap}$) value of ethanol in the super absorbent polymer.

2) The method of measuring $D_E$ is as follows.

An experiment is performed in the same manner as the method for measuring $D_{Sap}$, except that in step 1 of the method for measuring $D_{Sap}$, SAP as a sample was not filled and the ethanol solvent was input to a 5 mm NMR tube to a height of 6 cm.

In this disclosure, the element symbols used are those described in the periodic table.

Hereinafter, a super absorbent polymer and a method of preparing the same according to specific aspects of the disclosure will be described in more detail.

I. Polyacrylic Acid (Salt)-Based Super Absorbent Polymer

A super absorbent polymer (SAP) is prepared by crosslinking a polymer backbone consisting of carbon atoms to form a network structure and attaching water-loving ionic molecules to the network structure.

The stacking pattern of SAP particles varies depending on the shape and size of the particles. In addition, the rougher the surface of the particles that constitute the super absorbent polymer, the more the empty space between particles increases. Depending on the laminated shape of the particles, particle size, and particle surface roughness, the shape or size of the empty space between the super absorbent polymer particles may vary.

Since the empty space between particles forms a path for liquid to flow between the particles, the shape or size of this empty space between particles may have a significant impact on the absorption properties of the super absorbent polymer.

In addition, liquid permeability is known as a property for evaluating the flowability between conventional particles of the super absorbent polymer.

The liquid permeability is measured by placing the super absorbent polymer in a cylinder, pouring a saline solution so that the super absorbent polymer is completely submerged to swell the super absorbent polymer, and then measuring the time taken for the saline solution to pass through the swollen super absorbent polymer under a certain pressure.

Since the liquid permeability is a property that evaluates the flow of liquid in a swollen state of the super absorbent polymer, it does not provide any information about the characteristics of the empty space between particles before the super absorbent polymer particles are swollen.

The present inventors have derived a new factor called the ethanol diffusion coefficient in order to determine the characteristics of the empty space between particles before the super absorbent polymer absorbs liquid and swells. In addition, the present disclosure was completed by discovering that when the diffusion coefficient of ethanol in the super absorbent polymer has a specific numerical range, the absorption rate or absorption performance is improved.

The diffusion coefficient is an indicator of how active the diffusion phenomenon is. Diffusion of liquid between particles is affected by concentration and temperature, but even when these conditions are the same, it is affected by the shape or size of the empty space between particles, the morphology or roughness of the particle surface, or the arrangement between particles.

Ethanol does not swell the super absorbent polymer because it is not absorbed into the super absorbent polymer. Therefore, the diffusion coefficient of ethanol when the super absorbent polymer is immersed in ethanol can be affected by the shape or size of the empty space between super absorbent polymer particles, the morphology or roughness of the particle surface, or the arrangement between particles, and when the diffusion coefficient of ethanol in the super absorbent polymer is measured, indirect information about these can be obtained.

Since the shape or size of the empty space between super absorbent polymer particles, the morphology or roughness of the particle surface, or the arrangement between particles can affect the absorption characteristics of the super absorbent polymer, i.e., the absorption rate or absorption performance, the absorption characteristics of the super absorbent polymer may vary depending on the diffusion coefficient of ethanol in the super absorbent polymer.

In fact, the inventors confirmed that the absorption characteristics become excellent when the diffusion coefficient of ethanol in the super absorbent polymer is below a specific value.

Specifically, it was experimentally confirmed that absorption characteristics are improved when the diffusion coefficient of ethanol in a super absorbent polymer satisfies the following Equation 1.

$$(D_{Sap}/D_E)\times 100(\%)\leq 92.5(\%) \quad \text{[Equation 1]}$$

In Equation 1, $D_{Sap}$ represents a diffusion coefficient of ethanol in the super absorbent polymer as measured by nuclear magnetic resonance (NMR) spectroscopy, and $D_E$ is a diffusion coefficient of pure ethanol as measured by nuclear magnetic resonance spectroscopy.

In one aspect of the present disclosure, the super absorbent polymer may satisfy the following Equation 2.

$$80.0(\%)\leq(D_{Sap}/D_E)\times 100(\%) \quad \text{[Equation 2]}$$

In one aspect of the present disclosure, $D_{Sap}$ may be 8.0 $m^2/s$ or less, 7.9 $m^2/s$ or less, or 7.8 $m^2/s$ or less.

In one aspect of the present disclosure, $D_{Sap}$ may be 7.0 $m^2/s$ or more, 7.1 $m^2/s$ or more, or 7.2 $m^2/s$ or more.

In one aspect of the present disclosure, $(D_{Sap}/D_E)\times 100(\%)$ may be 80.0(%) or more or 81.0(%) or more, and 92.5(%) or less, 92.0(%) or less, or 91.0(%) or less, and may be 80.0(%) to 92.5(%), 80.0(%) to 92.0(%), 80.0(%) to 91.0 (%), 81.0(%) to 92.5(%), 81.0(%) to 92.0(%), or 81.0(%) to 91.0(%).

Convexity is known as a parameter for measuring the particle outline and particle surface roughness, and convexity is calculated by the following Equation 3.

$$M_c=L_s/L \quad \text{[Equation 3]}$$

In Equation 3, $M_c$ represents convexity, $L_s$ represents a length of a perimeter of a polygon of minimal perimeter that surrounds a two-dimensional (2D) image of a three-dimensional (3D) particle to be measured, and L represents an actual perimeter length of a 2D image of the 3D particle to be measured.

The value of convexity ranges from 0 to 1. The closer the convexity is to 1, the more the particle can be seen as having a very smooth outline. The closer the convexity is to 0, the more the particle can be seen as having a rough or uneven outline.

At this time, the average values of the convexity are measured after particles are randomly scattered over the stage by vacuum within the measuring device, and statistical results are derived by obtaining n of 200 or more and averaging them.

In one aspect of the present disclosure, the super absorbent polymer may have an average convexity value of 0.92 or less for all particles, as calculated using Equation 3.

In one aspect of the present disclosure, the average convexity value of all particles of the super absorbent polymer may be 0.80 or more, 0.83 or more, 0.85 or more, or 0.87 or more and 0.92 or less.

Convexity is a property related to the roughness of the particle surface, and since the roughness of the particle surface can affect the diffusion coefficient, the convexity of the super absorbent polymer may be related to the ethanol diffusion coefficient.

For example, when the value of convexity is small, that is, when the particle surface is rough, the ethanol present in the empty space between particles may be restricted from diffusing, and thus the diffusion coefficient may also be small. In other words, the coarser the particles of the super absorbent polymer, i.e., the smaller the convexity is, the smaller the ethanol diffusion coefficient may be.

The super absorbent polymer according to the present disclosure has excellent absorption characteristics because the convexity and ethanol diffusion coefficient have values below a specific numerical value. In one aspect of the present disclosure, the super absorbent polymer may have an average circle equivalent (CE) diameter of 220 μm to 400 μm.

The CE diameter refers to the diameter of a circle having the same area as a 2D image of a 3D particle, and the size of the particle may be expressed through the CE diameter. The average CE diameter value of the super absorbent polymer may be 220 m or more, 230 μm or more, or 240 μm or more, and 400 μm or less, 350 μm or less, 330 μm or less, 320 μm or less, or 310 μm or less.

Particle size may also be related to the ethanol diffusion coefficient because particle size can affect the structure of the empty space between particles. According to one aspect of the present disclosure, when the average CE diameter value is 220 μm to 400 μm, the ethanol diffusion coefficient can satisfy Equation 1 and excellent absorption performance can be achieved.

In addition, convexity and CE diameter may be measured using several commercial instruments that quantify and analyze particle morphology based on image analysis of the particles. For example, the parameters may be measured by Morphologi 4 from Malvern Panalytical, and specifically, may be measured by the following four steps, which are described in more detail in the experimental examples described below.

1) Sample preparation: Particles of a super absorbent polymer to be measured are prepared. At this time, when convexity is to be measured for particles with a specific range of particle diameters, a sample is prepared by classifying particles with a specific particle diameter using a classifier from Retsch at a 1.0 amplitude for 10 minutes.

At this time, the particle diameter of the super absorbent polymer particles may be measured according to the European Disposables and Nonwovens Association (EDANA) standard EDANA WSP 220.3 method.

2) Image acquisition: After setting the prepared sample on the stage inside the equipment, images of individual particles are obtained by scanning at 2.5× magnification.

3) Image processing: For the acquired images, a 2D image of each 3D particle, CE diameter, shortest diameter, longest diameter, actual particle circumference, and convex hull perimeter are measured.

4) Based on the data analyzed for each particle, a distribution map for the parameters for all particles included in the sample is derived.

In one aspect of the present disclosure, the super absorbent polymer has a centrifuge retention capacity (CRC) of 33 g/g or more, 34 g/g or more, or 35 g/g or more, as measured according to the EDANA method WSP 241.3. In addition, the centrifuge retention capacity measured by the same method may be 50 g/g or less, 45 g/g or less, or 40 g/g or less.

In addition, in one aspect of the present disclosure, the super absorbent polymer has an absorbency under pressure (AUP) of 28 g/g or more, 29 g/g or more, or 30 g/g or more, as measured under 0.3 psi according to the EDANA method WSP 242.3. In addition, the absorbency under pressure measured by the same method may be 45 g/g or less, 42 g/g or less, or 40 g/g or less.

In addition, in one aspect of the present disclosure, the super absorbent polymer may have an effective absorption capacity (EFFC) of 30 g/g or more, 31 g/g or more, 32 g/g or more, or 33 g/g or more as calculated by the following Equation 4. In addition, the effective absorption capacity (EFFC) calculated by Equation 4 may be 40 g/g or less, 39 g/g or less, 38 g/g or less, 37 g/g or less, or 36 g/g or less.

$$EFFC=(CRC+AUP)/2 \quad \text{[Equation 4]}$$

In Equation 4, CRC represents a centrifuge retention capacity (units: g/g) as measured according to the EDANA method WSP 241.3, and AUP represents an absorbency under pressure (units: g/g) as measured under 0.3 psi according to the EDANA method WSP 242.3.

In addition, in one aspect of the present disclosure, the super absorbent polymer may have an extractable component content of 5 wt % or less, 4.8 wt % or less, 4.5 wt % or less, 4.3 wt % or less, 4 wt % or less, or 3.9 wt % or less, as measured after swelling for 1 hour according to the EDANA method WSP 270.3. The lower the value of the content of the extractable component is, the better it is, and the lower limit is theoretically 0 wt %, but may be, for example, 0.1 wt % or more or 1 wt % or more.

In one aspect of the present disclosure, the super absorbent polymer may have an absorption rate (vortex time) of 40 seconds or less as measured by a vortex measurement method at 24.0° C.

More specifically, the absorption rate (vortex time) may be 40 seconds or less, 35 seconds or less, 33 seconds or less, or 30 seconds or less. In addition, the smaller the value of the absorption rate is, the better it is, and the lower limit of the absorption rate is theoretically 0 seconds, but may be, for example, 10 seconds or more, 15 seconds or more, or 20 seconds or more.

The methods for measuring the centrifuge retention capacity, absorbency under pressure, and absorption rate of the super absorbent polymer will be described in more detail in the experimental examples described below.

In addition, when the super absorbent polymer is swelled in water having an electrical conductivity value of 100 to 130 μS/cm for 1 minute, a maximum capacity of water that the super absorbent polymer may hold (free swelling capacity) may be 170 g/g or more, 175 g/g or more, 180 g/g or more, or 185 g/g or more, and 230 g/g or less, 225 g/g or less, or 220 g/g or less. This is a numerical value showing the absorption capacity of the super absorbent polymer.

In addition to sanitary materials, the super absorbent polymers are now widely used as soil water retainers for horticulture, water-retaining materials for civil engineering and construction, sheets for raising seedlings, and freshness-preserving agents and materials for steaming in the food distribution industry. Therefore, the super absorbent polymer needs to have excellent absorption properties for water with lower ion concentrations than 0.9% brine.

Urine and the like discharged from the body have similar ion concentrations and electrical conductivity to 0.9% brine, but in the case of 0.9% brine, the ion concentration is high, so the amount of brine absorbed by the super absorbent polymer is small and the absorption rate is relatively slow, making it difficult to completely evaluate the performance of the super absorbent polymer.

In addition, even when the same super absorbent polymer is used, the absorption behavior in water having an electrical conductivity of 100 to 130 μS/cm and the absorption behavior in 0.9% brine with an electrical conductivity of about 16,100 μS/cm are bound to be different. Accordingly, even when the initial absorption rate or maximum absorption capacity of the super absorbent polymer for 0.9% brine with an electrical conductivity of about 16,100 μS/cm is similar, the initial absorption rate or maximum absorption capacity of the super absorbent polymer for water with an electrical conductivity of 100 to 130 μS/cm is not necessarily similar. Therefore, it can be said that determining the absorption performance and absorption rate in water with an electrical conductivity of 100 to 130 μS/cm is independent of using 0.9% brine with an electrical conductivity of about 16,100 μS/cm.

Accordingly, the present inventors sought to develop a super absorbent polymer having an excellent absorption rate and absorption capacity for water having an electrical conductivity of 100 to 130 μS/cm, which has a lower ion concentration and electrical conductivity than 0.9% brine, that is, an electrical conductivity about 1/100 lower than that of 0.9% brine, and this was implemented by manufacturing the super absorbent polymer to satisfy Equation 1.

The present inventors have determined the maximum capacity of water that a super absorbent polymer can hold by using water having a lower ion concentration than 0.9% brine and an electrical conductivity at 24° C. of 100 to 130 μS/cm, which is about 1/100 lower than the electrical conductivity (about 16,100 μS/cm) at 24° C. of 0.9% brine, and in one aspect, water having an electrical conductivity of 110 μS/cm at 24° C. was used. For water having an electrical conductivity in the range of 100 to 130 μS/cm, there is no significant difference in absorption characteristics according to electrical conductivity.

The method of measuring absorption capacity in water having an electrical conductivity value of 100 to 130 μS/cm will be described in more detail in the experimental examples section described below.

Meanwhile, the super absorbent polymer according to the present disclosure may be implemented by appropriately controlling preparation process conditions such as the components/content of the super absorbent polymer, polymerization process conditions of the super absorbent polymer, or pulverizing process conditions. That is, by controlling these process conditions, it is possible to prepare a super absorbent polymer that satisfies Equation 1.

For example, the type and content of the monomer composition in a polymerization process; the type and content of an internal crosslinking agent; the type, input amount, and input timing of a surfactant, the type, input amount, and input timing of a neutralizing agent, the type, rotational speed, hole size, and number of micronizations of a micronization device in the neutralization and micronization steps, and the like may be controlled so that the super absorbent polymer satisfies Equation 1.

Hereinafter, each component that makes up the super absorbent polymer will be described in more detail.

A polyacrylic acid (salt)-based super absorbent polymer according to one aspect of the disclosure includes a base resin including a crosslinked polymer of a water-soluble ethylenically unsaturated monomer having an acidic group and an internal crosslinking agent. The crosslinked polymer may be formed by polymerizing a monomer composition including components such as a monomer, an internal crosslinking agent, and a polymerization initiator.

Here, the water-soluble ethylenically unsaturated monomer may be any monomer commonly used in the preparation of a super absorbent polymer. As a non-limiting example, the water-soluble ethylenically unsaturated monomer may be a compound represented by the following Chemical Formula 1:

$$R\text{—}COOM' \quad \text{[Chemical Formula 1]}$$

In Chemical Formula 1, R is an alkyl group having 2 to 5 carbon atoms and including an unsaturated bond, and M' is a hydrogen atom, a monovalent or divalent metal, an ammonium group, or an organic amine salt.

The monomer may be one or more selected from the group consisting of a (meth)acrylic acid, and a monovalent (alkali) metal salt, divalent metal salt, ammonium salt, and organic amine salt of this acid.

As such, when the (meth)acrylic acid and/or its salt are/is used as a water-soluble ethylenically unsaturated monomer, a super absorbent polymer with improved absorbency may be obtained, which is advantageous. In addition, as the monomers mentioned above, maleic anhydride, fumaric acid, crotonic acid, itaconic acid, 2-acryloylethane sulfonic acid, 2-methacryloylethane sulfonic acid, 2-(meth)acryloylpropanesulfonic acid, 2-(meth)acrylamide-2-methyl propane sulfonic acid, (meth)acrylamide, N-substituted (meth) acrylates, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth) acrylamide, or the like may be used.

The water-soluble ethylenically unsaturated monomer has an acidic group. Meanwhile, in the preparation of a super absorbent polymer, a polymer is formed by crosslinking and polymerizing a monomer in which some of the acidic groups are neutralized by a neutralizing agent, but in the present disclosure, the acidic groups may not be neutralized during polymerization, but may be neutralized after the polymer is formed. More specific details on this will be described in the section "Preparation method of the super absorbent polymer".

The concentration of the water-soluble ethylenically unsaturated monomer in the monomer composition may be appropriately adjusted in consideration of the polymerization time, reaction conditions, and the like, and may be about 20 to about 60 wt % or about 20 to about 40 wt %.

The term "internal crosslinking agent" used in this disclosure is a term used to distinguish it from a surface crosslinking agent for crosslinking the surface of a super absorbent polymer particles described below, and it serves to form a polymer including a crosslinked structure by introducing crosslinking bonds between the unsaturated bonds of the water-soluble ethylenically unsaturated monomers described above.

The crosslinking in the above step is performed without distinction between the surface and the interior, but when the surface crosslinking process of the super absorbent polymer particles described below is performed, the surface of the finally prepared super absorbent polymer particles may include a structure newly crosslinked by the surface crosslinking agent, and the interior of the super absorbent polymer particles may maintain the structure crosslinked by the internal crosslinking agent.

According to one aspect of the present disclosure, the internal crosslinking agent may include one or more of a polyfunctional acrylate-based compound, a polyfunctional allylic compound, or a polyfunctional vinyl-based compound.

Non-limiting examples of polyfunctional acrylate-based compounds include ethylene glycol di(meth)acrylate, diethylene glycol di(meth)acrylate, triethylene glycol di(meth) acrylate, tetraethylene glycol di(meth)acrylate, polyethylene glycol di(meth)acrylate, propylene glycol di(meth)acrylate, tripropylene glycol di(meth)acrylate, polypropylene glycol di(meth)acrylate, butanediol di(meth)acrylate, butylene glycol di(meth)acrylate, hexanediol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol, tetra(meth)acrylate, dipentaerythritol penta(meth)acrylate, trimethylolpropane di(meth)acrylate, trimethylolpropane tri(meth)acrylate, glycerin di(meth)acrylate, or glycerin tri(meth)acrylate, and these may be used alone or in combination of two or more.

Non-limiting examples of polyfunctional allylic compounds include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropylene glycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, or glycerin triallyl ether, and these may be used alone or in combination of two or more.

Non-limiting examples of polyfunctional vinyl-based compounds include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, or glycerin trivinyl ether, and these may be used alone or in combination of two or more. For example, pentaerythritol triallyl ether may be used.

The above-described polyfunctional allylic compound or polyfunctional vinyl-based compound may form a crosslinked structure during the polymerization process by allowing two or more unsaturated groups included in the molecule to bond with unsaturated bonds of water-soluble ethylenically unsaturated monomers or unsaturated bonds of other internal crosslinking agents, and unlike acrylate-based compounds including an ester bond (—(C═O)O—) in the molecule, the crosslinked bond may be more stably maintained even during the neutralization process after the polymerization reaction described below.

Accordingly, the gel strength of the prepared super absorbent polymer may be increased, process stability may be improved during the discharge process after polymerization, and the amount of extractable components may be minimized.

Crosslinking polymerization of the water-soluble ethylenically unsaturated monomer in the presence of such an internal crosslinking agent may be performed in the presence of a polymerization initiator and, as needed, a thickener, a plasticizer, a preservation stabilizer, an antioxidant, and the like.

In the monomer composition, such an internal crosslinking agent may be used in an amount of 0.01 to 5 parts by weight based on 100 parts by weight of the water-soluble ethylenically unsaturated monomer. For example, the internal crosslinking agent may be used in an amount of 0.01 parts by weight or more, 0.05 parts by weight or more, or 0.1 parts by weight or more, and 5 parts by weight or less, 3 parts by weight or less, 2 parts by weight or less, 1 part by weight or less, or 0.7 parts by weight or less, based on 100 parts by weight of the water-soluble ethylenically unsaturated monomer. When the content of the internal crosslinking agent is too low, crosslinking may not occur sufficiently, making it difficult to achieve strength above an appropriate level, and when the content of the internal crosslinking agent is too high, the internal crosslinking density may increase, making it difficult to achieve the desired centrifuge retention capacity. In particular, the above range is suitable for implementing a super absorbent polymer of the present disclosure that satisfies Equation 1, and the like.

Meanwhile, when the content of the internal crosslinking agent is small to ensure that the base resin has high centrifuge retention capacity (CRC), the gel strength of the formed polymer may be low, and the operation of a chopper, and the like may be difficult when cutting the hydrogel polymer due to the low gel strength. In this case, by mixing and using two or more internal crosslinking agents for operation of a high-speed rotary chopper, and the like, the gel strength may be increased, thereby improving the operating stability of the chopper, and the like.

In the formed hydrogel polymer, the shape of the particles may vary depending on the degree of internal crosslinking, and the polymer formed using such an internal crosslinking agent can have a three-dimensional network structure in which main chains formed by polymerizing the water-soluble ethylenically unsaturated monomer are crosslinked by the internal crosslinking agent.

As such, when the polymer has a three-dimensional network structure, the overall physical properties of the super absorbent polymer, such as centrifuge retention capacity and absorbency under pressure, may be remarkably improved compared to when the polymer has a two-dimensional linear structure that is not further crosslinked by an internal crosslinking agent.

The polymer is formed by polymerizing a monomer and an internal crosslinking agent in the presence of a polymerization initiator, and the type of polymerization initiator is not particularly limited, but the polymerization may be performed using a thermal polymerization method in a batch-type reactor, and thus a thermal polymerization initiator may be used as the polymerization initiator.

As the thermal polymerization initiator, one or more selected from the group of initiators consisting of a persulfate-based initiator, an azo-based initiator, hydrogen peroxide, and ascorbic acid may be used. Specifically, examples of persulfate-based initiators include sodium persulfate ($Na_2S_2O_8$), potassium persulfate ($K_2S_2O_8$), or ammonium persulfate ($(NH_4)_2S_2O_8$), and examples of azo-based initiators include 2,2-azobis(2-amidinopropane) dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride, or 4,4-azobis-(4-cyanovaleric acid). More diverse thermal polymerization initiators are provided in Odian's book, 'Principle of Polymerization (Wiley, 1981), p 203, and are not limited to the examples described above.

Such polymerization initiators may be used in an amount of 2 parts by weight or less based on 100 parts by weight of the water-soluble ethylenically unsaturated monomer. That is, when the concentration of the polymerization initiator is too low, the polymerization rate may be slow and a large amount of residual monomer may be extracted in the final product, which is not desirable. Conversely, when the concentration of the polymerization initiator is higher than the above range, the polymer chains forming the network become shorter, which is undesirable because the properties of the resin may deteriorate, such as increasing the content of extractable components and decreasing the absorbency under pressure.

Meanwhile, in one aspect of the present disclosure, polymerization may be initiated by inputting a reducing agent forming a redox couple with the polymerization initiator to the monomer composition.

Specifically, the initiator and reducing agent react with each other to form radicals when input to a polymer solution.

The formed radicals react with the monomer, and since the oxidation-reduction reaction between the initiator and the reducing agent is highly reactive, polymerization is initiated even when only a small amount of the initiator and reducing agent is input, so there is no need to increase the process temperature, enabling low-temperature polymerization and minimizing changes in the physical properties of the polymer solution.

The polymerization reaction using the oxidation-reduction reaction can occur smoothly even at a temperature near room temperature (25° C.) or lower. For example, the polymerization reaction may be performed at a temperature of 5° C. or higher and 25° C. or lower, or 5° C. or higher and 20° C. or lower.

In one aspect of the present disclosure, when a persulfate-based initiator is used as the initiator, the reducing agent may be one or more selected from the group consisting of sodium metabisulfite ($Na_2S_2O_5$); tetramethyl ethylenediamine (TMEDA); a mixture of iron (II) sulfate and EDTA ($FeSO_4$/EDTA); sodium formaldehyde sulfoxylate; and disodium 2-hydroxy-2-sulfinoacetate.

For example, potassium persulfate may be used as the initiator and disodium 2-hydroxy-2-sulfinoacetate may be used as the reducing agent; ammonium persulfate may be used as the initiator and tetramethylethylenediamine may be used as the reducing agent; or sodium persulfate may be used as the initiator and sodium formaldehyde sulfoxylate may be used as the reducing agent.

In another aspect of the present disclosure, when a hydrogen peroxide-based initiator is used as the initiator, the reducing agent may be one or more selected from the group consisting of ascorbic acid; sucrose; sodium sulfite ($Na_2SO_3$); sodium metabisulfite ($Na_2S_2O_5$); tetramethyl ethylenediamine (TMEDA); a mixture of iron (II) sulfate and EDTA ($FeSO_4$/EDTA); sodium formaldehyde sulfoxylate; disodium 2-hydroxy-2-sulfinoacteate; and disodium 2-hydroxy-2-sulfoacteate.

The monomer composition may additionally include additives such as a thickener, a plasticizer, a preservation stabilizer, and an antioxidant, as needed.

In addition, the monomer composition including the monomer may be, for example, in a solution state in which it is dissolved in a solvent such as water, and the solid content in the monomer composition in the solution state, i.e., the concentration of a monomer, an internal crosslinking agent and a polymerization initiator, may be appropriately controlled in consideration of the polymerization time and reaction conditions. For example, the solid content in the monomer composition may be 10 to 80 wt %, 15 to 60 wt %, or 30 to 50 wt %.

The solvent that may be used at this time is not limited on its composition as long as it can dissolve the above-described components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, or N,N-dimethylacetamide may be used in combination.

The polymer obtained in this way may be a polymer having a high molecular weight and a uniform molecular weight distribution by polymerizing an ethylenically unsaturated monomer in an unneutralized state. This reduces the content of extractable components, thereby improving the performance of the super absorbent polymer.

In addition, the polymer may have a moisture content of 30 to 80 wt %. For example, the moisture content of the polymer may be 30 wt % or more, 45 wt % or more, or 50 wt % or more, and 80 wt % or less, 70 wt % or less, or 60 wt % or less.

When the moisture content of the polymer is too low, it may be difficult to secure an appropriate surface area in the subsequent pulverizing step, and thus the polymer may not be pulverized effectively, and when the moisture content of the polymer is too high, the pressure applied in the subsequent pulverization step may increase, making it difficult to pulverize to the desired particle size.

Meanwhile, throughout this disclosure, the term “moisture content” means the content of moisture relative to the total polymer weight and is the value obtained by subtracting the weight of the polymer in a dry state from the weight of the polymer. Specifically, it is defined as a value calculated by measuring the weight reduction due to moisture evaporation in the polymer during the drying process by raising the temperature of the polymer in a crumb state through infrared heating. At this time, the drying conditions are such that the temperature is increased from room temperature to about 180° C. and then maintained at 180° C., and the total drying time is set to 40 minutes including a 5-minute temperature increase step, and the moisture content is measured.

A super absorbent polymer according to one aspect of the disclosure includes a base resin powder including the above-described crosslinked polymer of a water-soluble ethylenically unsaturated monomer having an acidic group and an internal crosslinking agent; and a surface crosslinked layer formed on the base resin powder by further crosslinking the crosslinked polymer via a surface crosslinking agent.

The surface crosslinked layer is formed on at least a portion of the surface of the base resin powder, and may be formed by additional crosslinking of the crosslinked polymer included in the base resin powder via a surface crosslinking agent.

As the surface crosslinking agent, any surface crosslinking agent that has been used in the preparation of the super absorbent polymer may be used without particular limitation. For example, the surface crosslinking agent may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; one or more carbonate-based compounds selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di- or poly-oxazolidinone compound; or a cyclic urea compound.

Specifically, one or more, two or more, or three or more of the surface crosslinking agents described above may be used as the surface crosslinking agent, and for example, ethylene carbonate-propylene carbonate (ECPC), propylene glycol, and/or glycerol carbonate may be used.

Such surface crosslinking agents may be used in an amount of about 0.001 to about 5 parts by weight based on 100 parts by weight of the super absorbent polymer particles. For example, the surface crosslinking agent may be used in an amount of 0.005 parts by weight or more, 0.01 parts by weight or more, or 0.05 parts by weight or more, and 5 parts by weight or less, 4 parts by weight or less, or 3 parts by weight or less, based on 100 parts by weight of the super absorbent polymer particles. By adjusting the content range of the surface crosslinking agent within the above range, a super absorbent polymer exhibiting excellent overall physical properties may be prepared. In particular, the above range is suitable for implementing a super absorbent polymer of the present disclosure that satisfies Equation 1, and the like.

In addition, the surface crosslinked layer may be formed by adding an inorganic material to the surface crosslinking agent. That is, in the presence of the surface crosslinking agent and the inorganic material, the surface of the base resin powder may be additionally crosslinked to form a surface crosslinked layer.

As such inorganic materials, one or more inorganic materials selected from the group consisting of silica, clay, alumina, a silica-alumina composite material, titania, zinc oxide, and aluminum sulfate may be used. The inorganic material may be used in powder or liquid form, and in particular as alumina powder, silica-alumina powder, titania powder, or nano silica solution. In addition, the inorganic material may be used in an amount of about 0.001 to about 1 part by weight based on 100 parts by weight of the super absorbent polymer particles.

As described above, a super absorbent polymer including the base resin powder and the surface crosslinked layer formed on the base resin powder may absorb body fluid or water at a fast rate, and may also absorb a relatively large amount initially, thereby preventing problems such as body fluid or water not being absorbed but accumulating or leaking out.

II. Preparation Method of Super Absorbent Polymer

Conventional super absorbent polymers are prepared by crosslinking and polymerizing a water-soluble ethylenically unsaturated monomer having at least some neutralized acidic groups in the presence of an internal crosslinking agent and a polymerization initiator to form a hydrogel polymer, drying the hydrogel polymer thus formed, and then pulverizing it to a desired particle size, and at this time, a chopping process is usually performed to cut the hydrogel polymer into particles of several millimeters in size before the drying process to facilitate drying of the hydrogel polymer and increase the efficiency of the pulverization process. However, in this chopping process, due to the adhesiveness of the hydrogel polymer, the hydrogel polymer is not pulverized to a micro-sized particle level and becomes an aggregated gel. When such an aggregated gel-shaped hydrogel polymer is dried, a plate-shaped dried product is formed, and in order to pulverize this down to a micro-sized particle level, it must go through a multi-step pulverizing process that reduces the adhesiveness of the polymer, and accordingly, there has been a problem that a lot of fine particles are generated during this process.

To solve this problem, a method was used in which the separated fine particles were mixed with an appropriate amount of water, reassembled into fine particles, and then reused in the chopping step or pre-drying step. However, in the process of reusing the fine particles in this way, problems such as increased device load and/or energy usage have occurred. In addition, the properties of the super absorbent polymer were deteriorated due to the fine particles remaining even after reuse without being classified.

As a result of repeated research to solve this problem, unlike the conventional method of preparing super absorbent polymers, in which polymerization is performed in a state where the acidic group of a water-soluble ethylenically unsaturated monomer is neutralized, it was confirmed that when polymerization is first performed in a state where the acidic group is not neutralized to form a polymer, and the hydrogel polymer is micronized in the presence of a surfactant and then the acidic group of the polymer is neutralized, or the acidic group of the polymer is neutralized to form a hydrogel polymer and then the hydrogel polymer is micronized in the presence of a surfactant, or the acidic group present in the polymer is neutralized at the same time as the micronization, the surfactant is present in a large amount on the surface of the polymer and can sufficiently play a role in lowering the high adhesiveness of the polymer, preventing the polymer from excessively agglomerating, and controlling the agglomeration state to a desired level.

Meanwhile, the super absorbent polymer according to the present disclosure may be implemented by controlling the resin components and content, polymerization conditions, or pulverizing process conditions. For example, the type and content of the monomer composition in a polymerization process; the type and content of an internal crosslinking agent; the type, input amount, and input timing of a surfactant, the type, input amount, and input timing of a neutralizing agent, the type, rotational speed, hole size, and number of micronizations of a micronization device in the neutralization and micronization steps; the component and content of the surface crosslinking solution, and the like may be controlled so that the super absorbent polymer satisfies Equation 1.

In particular, when performing a polymerization process, a micronization method, and a surface crosslinking process in the preparation process of the super absorbent polymer, neutralization time point and polymerization conditions, whether to apply a ultrafine pulverization process, the components and contents of a surface crosslinking solution, a hole size, a particle size through controlling a mesh size during a pulverization process, or the number of micronizations may be controlled so that the super absorbent polymer satisfies Equation 1.

Hereinafter, each step of the method of preparing a super absorbent polymer according to an aspect of the present disclosure will be described in more detail.

Step 1: Polymerization Step

First, polymerization is performed on a monomer composition including a water-soluble ethylenically unsaturated monomer having an acidic group and an internal crosslinking agent to prepare a base resin powder including a polymer in which the water-soluble ethylenically unsaturated monomer having the acidic group and the internal crosslinking agent are crosslinked.

This step may consist of a step of preparing a monomer composition by mixing a water-soluble ethylenically unsaturated monomer having an acidic group, an internal crosslinking agent, and a polymerization initiator, and a step of polymerizing the monomer composition to form a polymer.

Here, the contents of each component may be the same as in the above-described section “I. Super absorbent polymer”.

Meanwhile, the water-soluble ethylenically unsaturated monomer has an acidic group. As described above, in the preparation of a conventional super absorbent polymer, a polymer is formed by crosslinking and polymerizing a monomer in which at least some of the acidic groups are neutralized by a neutralizing agent. Specifically, in the step of mixing the water-soluble ethylenically unsaturated monomer having the acidic group, the internal crosslinking agent, the polymerization initiator and the neutralizing agent, at least a portion of the acidic groups of the water-soluble ethylenically unsaturated monomer are neutralized.

However, according to one aspect of the present disclosure, polymerization is first performed in a state where the acidic group of the water-soluble ethylenically unsaturated monomer is not neutralized to form a polymer.

The water-soluble ethylenically unsaturated monomer (e.g., acrylic acid) in which the acidic group is not neutralized is liquid at room temperature and has high miscibility with a solvent (water), so it is present in the state of a mixed solution in the monomer composition. However, a water-soluble ethylenically unsaturated monomer with neutralized acidic groups is solid at room temperature and has different solubility depending on the temperature of the solvent (water), and the solubility decreases at lower temperatures.

As such, a water-soluble ethylenically unsaturated monomer whose acidic group is not neutralized has higher solubility or miscibility in a solvent (water) than a monomer with neutralized acidic groups, so it does not precipitate even at low temperatures, and thus is advantageous for long-term polymerization at low temperatures. Accordingly, a water-soluble ethylenically unsaturated monomer in which the acidic group is not neutralized may be used for long-term polymerization to stably form a polymer having a higher molecular weight and a uniform molecular weight distribution.

In addition, since the formation of a polymer having a longer chain is possible, the effect of reducing the content of extractable components that are present in a non-crosslinked state due to incomplete polymerization or crosslinking may be achieved, and thus it is possible to implement a super absorbent polymer that satisfies Equation 1, and the like.

In addition, in this way, polymerization is first performed in a state where the acidic groups of the monomer are not neutralized to form a polymer, and after neutralization, the polymer is micronized in the presence of a surfactant, or after micronization in the presence of a surfactant, neutralization is performed, or when the acidic groups present in the polymer are neutralized at the same time as micronization, the surfactant may sufficiently play a role in reducing the adhesiveness of the polymer by being present in a large quantity on the surface of the polymer.

According to one aspect of the present disclosure, the step of performing polymerization on the monomer composition to form a polymer may be performed for 1 hour or more in a batch-type reactor.

In the conventional method of preparing a super absorbent polymer, the polymerization method is largely divided into thermal polymerization and photopolymerization depending on the polymerization energy source, and in the case of conventional thermal polymerization, it can be performed in a reactor with a stirring shaft such as a kneader, and in the case of photopolymerization, it can be performed in a flat-bottomed container.

Meanwhile, when the polymerization is performed as continuous polymerization, for example, when the polymerization is performed in a reactor having a reactor stirring shaft equipped with a conveyor belt, a new monomer composition is supplied to the reactor as the polymerization product moves, so that the polymerization is performed continuously, and thus polymers having different polymerization rates are mixed, and accordingly, it is difficult to achieve even polymerization throughout the monomer composition, which may result in the deterioration of the overall physical properties.

However, according to one aspect of the present disclosure, since polymerization is performed in a fixed-bed manner in a batch-type reactor, there is less concern that polymers with different polymerization rates will be mixed, and thus a polymer with consistent quality may be obtained.

In addition, the polymerization step is performed in a batch-type reactor having a predetermined volume, and the polymerization reaction is performed for a longer period of time, for example, 1 hour or more, 3 hours or more, or 6 hours or more, than when the polymerization is performed continuously in a reactor equipped with a conveyor belt. Despite the long polymerization reaction time as described above, since polymerization is performed on a water-soluble ethylenically unsaturated monomer in an unneutralized state, the monomer is not easily precipitated even when polymerization is performed for a long time, and thus it is advantageous for long-term polymerization.

Meanwhile, since polymerization in the batch-type reactor of the present disclosure uses a thermal polymerization method, the polymerization initiator uses a thermal polymerization initiator, and the description of the corresponding component is as described above.

Steps 2 and 3: Micronization and Neutralization Steps

Next, the method includes a step (step 2) of preparing a mixture including a micronized hydrogel polymer by micronizing the hydrogel polymer in the presence of a surfactant.

The micronization step is a step of micronizing the polymer in the presence of a surfactant, and is a step in which micronization and agglomeration into a size of tens to hundreds of micrometers occur simultaneously, rather than chopping the polymer into a size of millimeters.

That is, it is a step for manufacturing secondary aggregated particles in the form in which primary particles that are micronized into a size of tens to hundreds of micrometers are aggregated by imparting appropriate adhesiveness to the polymer. The hydrous super absorbent polymer particles, which are secondary aggregated particles manufactured through this step, have a normal particle size distribution and a greatly increased surface area, so that the absorption rate may be remarkably improved.

Meanwhile, when a high mechanical shear force is applied in the micronization step to perform ultra-fine pulverizing at a rotational speed of 500 rpm to 4,000 rpm, agglomerated hydrogel particles having finer pores may be formed.

At this time, when ultra-fine pulverizing is performed at a rotational speed of 500 rpm to 4,000 rpm, a high mechanical shear force is applied, so that fine pores of 100 μm or less are easily formed in the polymer, thereby increasing the surface roughness, and the total surface area of the polymer is significantly increased by the pores formed inside and outside the polymer particles. Since the fine pores are formed in a stable form compared to pores formed using a foaming agent in the polymerization step, the degree of fine particles generation by the pores may be remarkably reduced in a subsequent process. The super absorbent polymer particles manufactured in this step can have a remarkably increased surface area, making it possible to implement a super absorbent polymer of the present disclosure that satisfies Equation 1, and the like.

The ultra-fine pulverizing process is performed at a rotational speed of 500 rpm to 4,000 rpm, and when the rotational speed of the process is less than 500 rpm, since it is difficult to form sufficient pores to the desired degree, it is difficult to expect a fast absorption rate and secure the desired level of productivity. In addition, when the rotational speed exceeds 4,000 rpm, the polymer chains may be damaged due to excessive shear force, and thus the extractable components may increase, and the overall physical properties of the prepared super absorbent polymer may be somewhat deteriorated. For example, the ultra-fine pulverizing process may be performed at 1,000 rpm to 3,500 rpm, or 2,000 rpm to 3,000 rpm. In this range, it is easy to form the desired fine pores without the above-described problems.

According to one aspect of the present disclosure, the micronization step is performed by a micronization device, the micronization device may include a body part including a transport space in which a polymer is transported therein; a screw member rotatably installed inside the transport space to allow the polymer to move; a driving motor providing a rotational driving force to the screw member; a cutter member installed in the body part to pulverize the polymer; and a porous plate having a plurality of holes formed therein, which discharges the polymer pulverized by the cutter member to the outside of the body part.

At this time, the hole size provided in the porous plate of the micronization device may be 1 mm to 25 mm, 5 mm to 20 mm, or 5 mm to 15 mm.

As such, when the polymer mixed with the surfactant is micronized while controlling agglomeration using a micronization device, a smaller particle size distribution is implemented, so that the subsequent drying and pulverizing processes may be performed under milder conditions, thereby preventing fine particles from occurring and improving the properties of the super absorbent polymer, and when ultra-fine pulverizing is performed, the absorption rate may be improved by simultaneously forming appropriate fine pores on the surface of the polymer and increasing the surface area.

The micronization step may be performed one or more times, for example one to six times, one to four times, or one to three times. This may be performed using a plurality of microionization devices, or a single microionization device including a plurality of porous plates and/or a plurality of cutter members, or among the plurality of microionization devices, some of the devices may include a plurality of porous plates and/or a plurality of cutter members.

According to one aspect of the present disclosure, a surfactant may be additionally used in the micronization step, and thus agglomeration between polymer particles is effectively controlled, thereby reducing the load on the equipment used in the pulverization process and further improving productivity.

The surfactant may be selected from compounds represented by the following Chemical Formulas 2-1 to 2-14, but is not limited thereto:

[Chemical Formula 2-1]

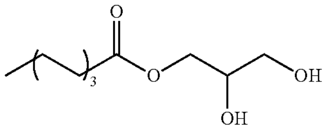

-continued

[Chemical Formula 2-2]

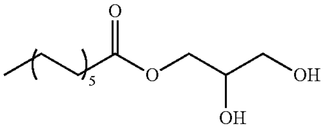

[Chemical Formula 2-3]

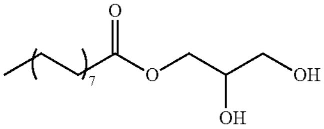

[Chemical Formula 2-4]

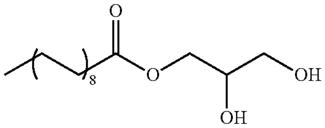

[Chemical Formula 2-5]

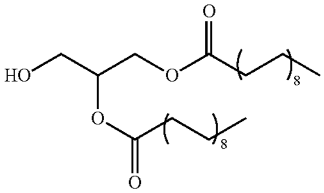

[Chemical Formula 2-6]

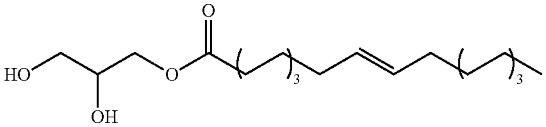

[Chemical Formula 2-7]

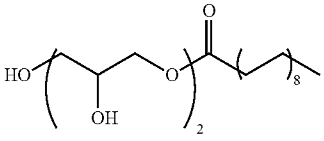

[Chemical Formula 2-8]

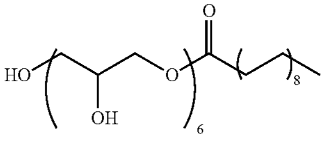

[Chemical Formula 2-9]

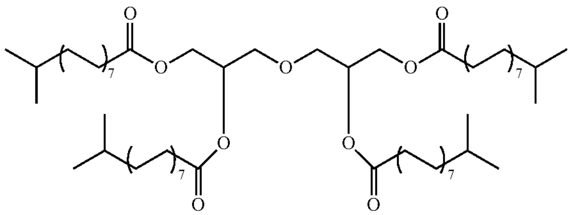

[Chemical Formula 2-10]

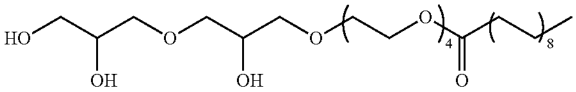

[Chemical Formula 2-11]

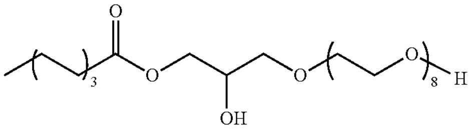

-continued

[Chemical Formula 2-12]

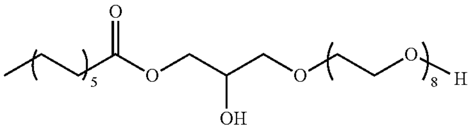

[Chemical Formula 2-13]

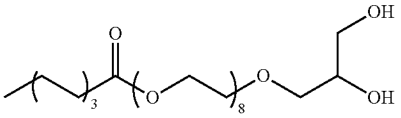

[Chemical Formula 2-14]

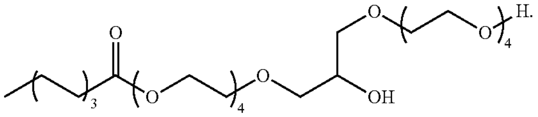

Meanwhile, the amount of the surfactant used is not particularly limited, but the surfactant may be used in an amount of 0.06 g to 0.48 g per 1,000 g of the hydrogel polymer depending on the productivity required or the device load condition.

When the surfactant is used in an excessively small amount, the surfactant may not be evenly adsorbed on the polymer surface, causing re-agglomeration of particles after pulverizing, or the absorption performance, such as centrifuge retention capacity and absorbency under pressure, may be reduced due to a large part of the surfactant being sharing with the polymer. Meanwhile, when the surfactant is used in an excessive amount, the overall properties of the finally prepared super absorbent polymer may deteriorate due to a decrease in surface tension.

Therefore, for example, the surfactant may be used in an amount of 0.06 g or more, 0.1 g or more, 0.2 g or more, and 0.48 g or less, 0.45 g or less, or 0.4 g or less per 1,000 g of the hydrogel polymer. In this case, the super absorbent polymer may be controlled to satisfy Equation 1, and the like.

The method for mixing the surfactant with the polymer is not particularly limited, and any method that may evenly mix it with the polymer may be appropriately adopted and used. Specifically, the surfactant may be mixed in a dry manner, dissolved in a solvent and then mixed in a solution state, or melted and then mixed.

For example, the surfactant may be mixed in a solution state in which it is dissolved in a solvent. At this time, any type of solvent may be used without limitation, including inorganic and organic solvents, but water is most appropriate when considering the ease of the drying process and the cost of the solvent recovery system. In addition, the solution may be prepared by mixing the surfactant and the polymer in a reaction tank, by putting the polymer in a mixer and spraying the solution, or by continuously supplying the polymer and the solution to a continuously operating mixer.

Meanwhile, when the surfactant is mixed in a solution state in which it is dissolved in water, it may be used after being diluted to an aqueous solution with a concentration of about 0.01% to 90%.

For example, when the surfactant is to be used in an amount of 0.1 g per 1,000 g of the hydrogel polymer, 100 g of an aqueous solution having a concentration of 0.1%, in which 0.1 g of the surfactant is dissolved in 99.9 g of water, can be used. Alternatively, 10 g of an aqueous solution having a concentration of 1%, in which 0.1 g of surfactant is dissolved in 9.9 g of water, may be used.

That is, when using the same amount of surfactant, the water content may be increased or decreased to use the surfactant in an aqueous solution having a desired concentration, and the concentration may be appropriately adjusted in consideration of the properties of the super absorbent polymer to be finally prepared.

According to one aspect of the present disclosure, a step of neutralizing at least some of the acidic groups of the polymer (step 3) is performed, and the micronization step of step 2 described above and the neutralization step of step 3 may be performed sequentially, alternately, or simultaneously.

That is, a neutralizing agent may be input to the polymer to first neutralize the acidic group, and then a surfactant may be input to the neutralized polymer to micronize the polymer mixed with the surfactant (performed in the order of step 3→step 2), or a neutralizing agent and a surfactant may be input to the polymer at the same time to neutralize and micronize the polymer (perform steps 2 and 3 at the same time). Alternatively, the surfactant may be input first and then the neutralizing agent be input (performed in the order of step 2→step 3). Alternatively, the neutralizer and surfactant may be input alternately. Alternatively, the surfactant may be input first to form particles, then a neutralizing agent may be input to neutralize the particles, and then and additional surfactant may be input to the neutralized hydrogel polymer to further perform the micronization process.

In this case, when the neutralization step is performed independently from the micronization step of step 2, it may be performed in a manner in which the additive is input simultaneously with the pulverization of the polymer. More specifically, a screw-type extruder including a porous plate having a plurality of holes formed therein may be used. The screw-type extruder is a device that performs pulverization under milder conditions compared to the micronization device used in the micronization step, and the rotational speed may be about 150 rpm to 500 rpm, and the holes of the porous plate may have a size of about 3 mm to 25 mm, but are not limited thereto.

The rotational speed of the screw-type extruder and the size of the porous plate holes affect the discharge state of the super absorbent polymer discharged from the extruder, and the particle shape of the super absorbent polymer may change depending on the discharge state.

In particular, by adjusting the rotational speed of the screw-type extruder to 150 rpm to 500 rpm, the super absorbent polymer may be controlled to satisfy Equation 1, and the like.

At this time, basic materials such as sodium hydroxide, potassium hydroxide, and ammonium hydroxide that can neutralize acidic groups may be used as neutralizing agents.

In addition, the degree of neutralization, which refers to the degree of neutralization of acidic groups included in the polymer by the neutralizing agent, may be 50 to 90 mol %, 60 to 85 mol %, 65 to 85 mol %, or 65 to 80 mol %. The range of the degree of neutralization may vary depending on the final properties, and the absorption rate and absorption performance may be controlled by adjusting the degree of neutralization.

At this time, when the degree of neutralization is too high, the absorption capacity of the super absorbent polymer may decrease, and the concentration of carboxyl groups on the particle surface is too low, and thus it may be difficult to properly perform surface crosslinking in a subsequent process, which may result in a decrease in absorbency under pressure characteristics or liquid permeability. On the other hand, when the degree of neutralization is too low, not only will the absorbency of the polymer greatly decrease, but it may also exhibit properties similar to elastic rubber that are difficult to handle.

Meanwhile, it may be desirable to have a certain time gap between the inputting of the neutralizing agent and the micronization process to ensure even neutralization of the entire polymer.

Step 4: Drying Step

Next, a step of drying the micronized and neutralized polymer to prepare a base resin powder (step 4) is performed.

This step is a step of drying the moisture in the base resin powder, which is a polymer obtained by neutralizing at least some of the acidic groups of the polymer and microionizing the polymer.

In a conventional method of preparing a super absorbent polymer, the drying step is performed so that the moisture content of the base resin powder becomes about 4 to 20 wt %, about 4 to about 15 wt %, or about 6 to about 13 wt %. However, the present disclosure is not limited thereto.

Step 4 may be performed by fixed-bed type drying, a moving type drying, or a combination thereof.

According to one aspect of the disclosure, step 4 may be performed by fixed-bed type drying.

The fixed-bed type drying refers to a method in which the material to be dried is placed on a porous iron plate through which air can pass and the material is dried by passing hot air from the bottom to the top.

Since the fixed-bed type drying dries in a plate-like shape without particle movement, it is difficult to achieve uniform drying simply by the flow of hot air. Therefore, fixed-bed type drying requires delicate control of hot air and temperature to obtain a dried product having a uniform high-moisture content. In the present disclosure, by changing the direction of hot air from the bottom to the top, the plate-shaped dried product is prevented from bending during drying, thereby preventing the hot air from leaking. In addition, the drying temperature was changed by section so that the upper, middle, and lower layers inside the dried product could be dried evenly with a moisture content difference of less than 5%.

Devices that may be used for drying using the fixed-bed type drying method include, but are not limited to, belt-type dryers.

For the fixed-bed type drying step, the drying process may be performed at a temperature of about 80° C. to 200° C., 90° C. to 190° C., or 100° C. to 180° C. When the drying temperature is lower than 80° C., the drying time may become too long, and when the drying temperature is higher than 200° C. and too high, a super absorbent polymer having a moisture content lower than the desired moisture content may be obtained. Meanwhile, the term "drying temperature" may mean the temperature of the hot air used or the internal temperature of the instrument during the drying process.

According to one aspect of the disclosure, step 4 may be performed by moving type drying.

The term "moving type drying" refers to a drying method in which the dried product is mechanically stirred during drying. At this time, the direction in which the hot air passes through the material may be the same as or different from the direction in which the material circulates. Alternatively, the material may be dried by circulating it inside the dryer and passing a heat-mediating fluid (heat-mediating oil) through a separate pipe outside the dryer.

Devices that may be used for drying using this moving type drying method may include a horizontal-type mixer, a rotary kiln, a paddle dryer, a steam tube dryer, or a commonly used moving type dryer.

For the moving type drying step, the drying process may be performed at a temperature of about 100° C. to 300° C., 120° C. to 280° C., or 150° C. to 250° C. When the drying temperature is too low, such as below 100° C., the drying time may become too long, and when the drying temperature is too high, such as above 300° C., the polymer chain of a super absorbent polymer may be damaged, resulting in a decline in overall physical properties, and a super absorbent polymer having a lower moisture content than the desired moisture content may be obtained.

Step 5: Pulverizing Step

Next, a step of pulverizing the dried base resin powder is performed.

Specifically, the pulverizing step may be performed by pulverizing the dry base resin powder to have a particle size of a normal particle level, i.e., a particle size of 150 μm to 850 μm.

The pulverizer used for this purpose may be specifically a vertical grinder, a turbo cutter, a turbo grinder, a rotary cutter mill, a cutter mill, a disc mill, a shred crusher, a crusher, a chopper, or a disc cutter, but is not limited to these examples.

Alternatively, a pulverizer such as a pin mill, a hammer mill, a screw mill, a roll mill, a disc mill or a jog mill may be used, but is not limited to these examples.

Meanwhile, in the preparation method of the present disclosure, in the micronization step, super absorbent polymer particles having a smaller particle size distribution than in the conventional chopping step may be implemented, and since the moisture content after drying is maintained relatively high, even when the pulverizing is performed under mild conditions with a smaller pulverizing force, a super absorbent polymer having a very high content of a normal particle size of 150 μm to 850 μm can be formed, and the fine particle generation ratio may be greatly reduced.

The super absorbent polymer particles manufactured as described above may include super absorbent polymer particles having a particle diameter of 150 μm to 850 μm, i.e., normal particles in an amount of 80 wt % or more, 85 wt % or more, 89 wt % or more, 90 wt % or more, 92 wt % or more, 93 wt % or more, 94 wt % or more, or 95 wt % or more, based on the total weight. At this time, the particle diameter of these polymer particles may be measured according to the European Disposables and Nonwovens Association (EDANA) standard EDANA WSP 220.3 method.

In addition, the super absorbent polymer particles may include fine particles having a particle diameter of less than 150 μm in an amount of about 20 wt % or less, about 18 wt % or less, about 15 wt % or less, about 13 wt % or less, about 12 wt % or less, about 11 wt % or less, about 10 wt % or less, about 9 wt % or less, about 8 wt % or less, or about 5 wt % or less, based on the total weight. This is in contrast to the case where the super absorbent polymer is prepared using a conventional manufacturing method, which has a fine particle content of about 20 wt % to about 30 wt %.

Additive Input Step

Meanwhile, according to one aspect of the disclosure, a step of inputting an additive to the micronized and neutralized polymer may be further included before the drying step (step 4).

The additive input process is a process for improving properties by using additional additives within a range that does not hinder the desired effect, and the types of additives are not particularly limited, and examples thereof include, but are not limited to, a polymerization initiator for removing residual monomers, a liquid permeability improver for improving absorption properties, fine particles for recycling the fine particles generated, an anti-caking agent, a fluidity improver, an antioxidant, a neutralizing agent, a surfactant, and the like.

The additive input step may be performed simultaneously with step 2, simultaneously with step 3, after steps 2 and 3, or in one or more of these steps. The additive input step may be performed multiple times as needed, and may also be performed more than once in each step.

When the additive input step is performed independently from steps 2 and 3, i.e., when performed after step 2 and step 3 but before step 4, it may be performed in a way that the additives are input simultaneously with the polymer being pulverized.

The pulverizing may be applied in the same manner as the pulverizing step of step 5 described above, and the additive may be input once or multiple times during the pulverizing step and mixed with the polymer.

Classification Step

Next, after the step of pulverizing the base resin powder (step 5), a step of classifying the pulverized super absorbent polymer particles according to particle diameter may be further included.

Surface Crosslinking Step

In addition, the method may further include a step of forming a surface crosslinked layer on at least a portion of the surface of the base resin particles in the presence of a surface crosslinking agent after pulverizing (step 5) and/or classifying the base resin powder. Through this step, the crosslinked polymer included in the base resin powder may be additionally crosslinked via a surface crosslinking agent, so that a surface crosslinked layer may be formed on at least a portion of the surface of the base resin powder.

The description of the surface crosslinking agent may all be the same as described above.

In addition, there is no limitation on the composition of the method of mixing the surface crosslinking agent with the base resin powder. For example, a method in which a composition including a surface crosslinking agent and a base resin powder is placed in a reaction tank and mixed, a method in which a surface crosslinking agent is sprayed onto the composition, and a method in which the resin composition and the surface crosslinking agent are continuously supplied to a continuously operating mixer and mixed may be used.

When mixing the surface crosslinking agent and base resin powder, water and methanol may be additionally mixed and added. When adding water and methanol, there is an advantage in that the surface crosslinking agent may be evenly dispersed in the resin composition. At this time, the content of water and methanol added may be appropriately adjusted to induce even dispersion of the surface crosslinking agent, prevent clumping of the resin composition, and optimize the surface penetration depth of the crosslinking agent.

The surface crosslinking process may be performed at a temperature of about 80° C. to about 250° C. More specifically, the surface crosslinking process may be performed at a temperature of about 100° C. to about 220° C. or about 120° C. to about 200° C. for about 20 minutes to about 2 hours or about 40 minutes to about 80 minutes. When the conditions for the surface crosslinking process described above are met, the surface of the super absorbent polymer particles may be sufficiently crosslinked, thereby increasing the absorbency under pressure.

The temperature-increasing means for the surface crosslinking reaction is not particularly limited.

Heating may be accomplished by supplying a heat medium or directly supplying a heat source. At this time, the types of heating medium that may be used include, but are not limited to, heated fluids such as steam, hot air, and hot oil, and the temperature of the supplied heating medium may be appropriately selected by considering the means of the heating medium, the heating rate, and the target temperature for heating. Meanwhile, as a directly supplied heat source, methods including heating through electricity and heating through gas may be included, but are not limited to these examples.

Post-Treatment Step

According to one aspect of the present disclosure, the method may further include, after forming a surface crosslinked layer on at least a portion of the surface of the base resin powder, at least one of a cooling step for cooling the super absorbent polymer particles on which the surface crosslinked layer is formed, a watering step for inputting water to the super absorbent polymer particles on which the surface crosslinked layer is formed, and a post-treatment step for inputting an additive to the super absorbent polymer particles on which the surface crosslinked layer is formed. At this time, the cooling step, the watering step, and the post-treatment step may be performed sequentially or simultaneously.

Water or brine may be used in the watering step, thereby controlling the generation amount of riddlings, and the like. The amount of water used may be appropriately adjusted considering the moisture content of a desired final product, and the like, and may be 0.1 to 10 wt %, 0.5 to 8 wt %, or 1 to 5 wt % relative to the absorbent polymer, but is not limited thereto.

In addition, a maturation step may be further performed after the watering step.

When using brine in the watering step, the solution absorption rate is relatively low due to the conductivity of the brine, so that the brine evenly spreads in the maturation step, enabling even absorption by the absorbent polymer. The maturation step may be performed without any special limitation by a commonly used method, for example, at a temperature of 100° C. or lower, 80° C. or lower, or 50° C. or lower for 10 minutes to 1 hour using a rotary stirring device.

The additives input in the post-treatment step may include surfactants, inorganic salts, liquid permeability improvers, anti-caking agents, fluidity improvers, and antioxidants, but the present disclosure is not limited thereto.

By selectively performing the cooling step, watering step, and post-treatment step, the moisture content of the final super absorbent polymer may be improved by controlling the occurrence of riddlings, and the like, and a higher quality super absorbent polymer product may be manufactured.

The description of the method of preparing the super absorbent polymer of the present disclosure may be applied to the super absorbent polymer of the present disclosure described above.

Hereinafter, the operation and effect of aspects of the disclosure will be described in more detail through specific examples of aspects of the disclosure. However, the following examples are only presented as examples of aspects of the disclosure, and the scope of the disclosure is not determined thereby.

EXAMPLES

Example 1

(Step 1: Polymer Preparation Step)

In a 5 L glass container equipped with a stirrer and a thermometer, 1500 g of acrylic acid, 3.75 g of pentaerythritol triallyl ether (PETTAE) as an internal crosslinking agent, and 3401 g of water were stirred and mixed, and reacted while maintaining the temperature at 5° C. Nitrogen was input at a rate of 1,000 cc/min into the glass container including the mixture for 1 hour to replace the inside of the glass container with nitrogen. Next, 30.0 g of a 0.3% hydrogen peroxide aqueous solution as a polymerization initiator, 15.0 g of a 1% aqueous solution of ascorbic acid, and 45.0 g of a 2% aqueous solution of 2,2'-azobis-(2-amidinopropane)dihydrochloric acid were input, and at the same time, 22.5 g of a 0.01% aqueous solution of iron sulfate was input as a reducing agent to initiate polymerization. The temperature of the mixture reached 85° C., and then the mixture was polymerized at 90±2° C. for about 6 hours to obtain a polymer.

(Steps 2 and 3: Micronization and Neutralization Steps)

299 g of a 0.45 wt % aqueous solution of glycerol monolaurate (GML) was input to 5,000 g of the polymer obtained in Step 1. Thereafter, the resulting polymer was pushed through a porous plate with multiple 10 mm holes at a rotational speed of 2,000 rpm using a high-speed rotary chopper (F-150/Karl Schnell) equipped inside a cylindrical grinder to perform a micronization process.

Thereafter, the recovered hydrogel polymer was further pushed three times through a porous plate having multiple 10 mm holes at a rotational speed of 150 rpm using a screw-type extruder equipped inside the cylindrical grinder to perform a pulverization process. In each step of the screw-type extruder, 1383 g of a 50% NaOH aqueous solution (Step 3: neutralization stage) was input to neutralize a portion of the acidic groups of the polymer, and then 100 g of fine particles (additional additive input step) and 157 g of a 10% $Na_2SO_4$ aqueous solution (additional additive input step) were each added to prepare hydrous super absorbent polymer particles (=micronized and neutralized polymer).

(Step 4: Drying Step)

1,000 g of the hydrous super absorbent polymer particles were input to a ventilated belt-type dryer including a porous plate capable of vertically transferring air flow. 200° C. hot air and 100° C. hot air were sequentially flowed from the top to the bottom for 5 minutes and 10 minutes, respectively, so that the moisture content of the dried super absorbent polymer became about 10%, and then 100° C. hot air was flowed from the bottom to the top for 15 minutes to uniformly dry the polymer.

(Step 5: Pulverizing and Classification Step)

The dried product was ground with a grinder (GRAN-U-LIZERM, MPE) and then classified through a standard mesh sieve of ASTM standards to obtain a base resin powder having a size of 150 to 850 μm.

(Surface Crosslinking Step)

Next, a surface crosslinking agent aqueous solution including 4 g of water, 6 g of methanol, 0.05 g of ethylene glycol diglycidyl ether (EJ-1030S), 0.1 g of propylene glycol, and 0.2 g of aluminum sulfate per 100 g of the base resin powder was sprayed, stirred at room temperature, and mixed to evenly distribute the surface crosslinking solution on the super absorbent polymer powder. Subsequently, the base resin powder mixed with the surface crosslinking solution was placed in a surface crosslinking reactor, and a surface crosslinking reaction was performed. In the surface crosslinking reactor, the base resin powder was subjected to a surface crosslinking reaction at about 140° C. for 40 minutes to obtain a surface crosslinked super absorbent polymer.

After the surface crosslinking step, a super absorbent polymer (moisture content: 1.9%) having a particle size of 150 μm to 850 μm was prepared by classifying through a standard mesh sieve according to ASTM standards.

Example 2

(Step 1: Polymer Preparation Step)

In a 5 L glass container equipped with a stirrer and a thermometer, 1500 g of acrylic acid, 3.75 g of pentaerythritol triallyl ether (PETTAE) as an internal crosslinking agent, and 3401 g of water were stirred and mixed, and reacted while maintaining the temperature at 5° C. Nitrogen was input at a rate of 1,000 cc/min into the glass container including the mixture for 1 hour to replace the inside of the glass container with nitrogen. Next, 30.0 g of a 0.3% hydrogen peroxide aqueous solution as a polymerization initiator, 15.0 g of a 1% aqueous solution of ascorbic acid, and 45.0 g of a 2% aqueous solution of 2,2'-azobis-(2-amidinopropane)dihydrochloric acid were input, and at the same time, 22.5 g of a 0.01% aqueous solution of iron sulfate was input as a reducing agent to initiate polymerization. The temperature of the mixture reached 85° C., and then the mixture was polymerized at 85±2° C. for about 8 hours to obtain a polymer.

(Steps 2 and 3: Micronization and Neutralization Steps)

100 g of a 0.45 wt % aqueous solution of glycerol monolaurate (GML) was input to 5,000 g of the polymer obtained in Step 1. Thereafter, the resulting polymer was pushed through a porous plate with multiple 15 mm holes at a rotational speed of 1,500 rpm using a high-speed rotary chopper (F-150/Karl Schnell) equipped inside a cylindrical grinder to perform a micronization process.

Thereafter, the recovered hydrogel polymer was further pushed three times through a porous plate having multiple 6 mm holes at a rotational speed of 500 rpm using a screw-type extruder equipped inside the cylindrical grinder to perform a pulverization process. In each step of the screw-type extruder, 1383 g of a 50% NaOH aqueous solution (Step 3: neutralization stage) was input to neutralize a portion of the acidic groups of the polymer, and then 100 g of fine particles (additional additive input step) and 157 g of a 10% $Na_2SO_4$ aqueous solution (additional additive input step) were each added to prepare hydrous super absorbent polymer particles (=micronized and neutralized polymer).

Thereafter, drying, pulverization, classification, and surface crosslinking steps were performed in the same manner as in Example 1 to prepare a super absorbent polymer (moisture content: 1.7%) having a particle size of 150 μm to 850 μm.

Example 3

(Step 1: Polymer Preparation Step)

A polymer was prepared using the same method as in Example 1.

(Steps 2 and 3: Micronization and Neutralization Steps)

100 g of a 0.45 wt % aqueous solution of glycerol monolaurate (GML) was input to 5,000 g of the polymer obtained in Step 1. Thereafter, the resulting polymer was pushed through a porous plate with multiple 10 mm holes at a rotational speed of 2,000 rpm using a high-speed rotary chopper (F-150/Karl Schnell) equipped inside a cylindrical grinder to perform a micronization process.

Thereafter, the recovered hydrogel polymer was further pushed three times through a porous plate having multiple 10 mm holes at a rotational speed of 250 rpm using a screw-type extruder equipped inside the cylindrical grinder to perform a pulverization process. In each step of the screw-type extruder, 1383 g of a 50% NaOH aqueous solution (Step 3: neutralization stage) was input to neutralize a portion of the acidic groups of the polymer, and then 100 g of fine particles (additional additive input step) and 157 g of a 10% $Na_2SO_4$ aqueous solution (additional additive input step) were each added to prepare hydrous super absorbent polymer particles (=micronized and neutralized polymer).

Thereafter, drying, pulverization, classification, and surface crosslinking steps were performed in the same manner as in Example 1 to prepare a super absorbent polymer (moisture content: 1.8%) having a particle size of 150 μm to 850 μm.

Example 4

Steps 1 to 5 were performed in the same manner as in Example 1 to obtain a base resin powder having a size of 150 to 850 μm.

(Surface Crosslinking Step)

Next, a surface crosslinking agent aqueous solution including 5 g of water, 6 g of methanol, 0.08 g of ethylene glycol diglycidyl ether (EJ-1030S), 0.1 g of propylene glycol, 0.2 g of aluminum sulfate, 0.03 g of sucrose stearate, and 0.25 g of silica particles (Aerosil 200) per 100 g of the base resin powder was sprayed, stirred at room temperature, and mixed to evenly distribute the surface crosslinking solution on the super absorbent polymer powder. Thereafter, a surface crosslinking reaction was performed in the same manner as in Example 1 to obtain a surface crosslinked super absorbent polymer.

Comparative Example 1

In Comparative Example 1, a super absorbent polymer was prepared by a method of preparing a super absorbent polymer, including neutralizing at least some of the acidic groups of a water-soluble ethylenically unsaturated monomer (neutralization); crosslinking and polymerizing a water-soluble ethylenically unsaturated monomer having at least some of the acidic groups neutralized in the presence of an internal crosslinking agent and a polymerization initiator to form a hydrogel polymer (polymerization); chopping the hydrogel polymer (chopping); drying the chopped hydrogel polymer (drying); pulverizing the dried polymer and then classifying it into normal particles and fine particles (pulverization/classification); and forming a surface crosslinked layer on at least a portion of the surface of the normal particles in the presence of a surface crosslinking agent (surface crosslinking).

Specifically, the preparation process of Comparative Example 1 was as follows.

(Neutralization and Polymerization)

A monomer composition was prepared by mixing 495 g of acrylic acid, 0.4 g of ethylene glycol diglycidyl ether as an internal crosslinking agent, 19.2 g of 1% IGAGURE 819 as a photopolymerization initiator, 0.6 g of capsule-type foaming agent F-36D as a foaming agent, 0.1 g of sodium dodecyl sulfate as a foaming stabilizer, and 292.6 g of water in a 3 L glass container equipped with a stirrer and a thermometer. Subsequently, while the monomer solution was continuously supplied using a quantitative pump, 611.1 g of a 31 wt % sodium hydroxide aqueous solution was continuously mixed through the line to prepare a monomer aqueous solution. At this time, after confirming that the temperature of the monomer aqueous solution had risen to approximately 72° C. or higher due to the heat of neutralization, waiting was performed for the temperature to cool to 40° C. When the temperature was cooled to 40° C., 41.2 g of a 2 wt % sodium persulfate aqueous solution and 21.2 g of a mixed solution of 0.6 g of sodium bicarbonate dissolved in a 1 wt % sodium dodecyl sulfate aqueous solution were added. The mixed solution was placed in a stainless steel vessel measuring 250 mm in width, 250 mm in length, and 30 mm in height, which was installed in a square polymerization reactor equipped with a light irradiation device on the top and preheated to 80° C. inside, and light irradiation was performed to initiate photopolymerization. It was confirmed that after about 15 seconds of light irradiation, a gel was generated from the surface, and after approximately 30 seconds, a polymerization reaction occurred simultaneously with foaming, and a sheet-shaped hydrogel polymer was obtained by additionally reacting for 3 minutes.

(Chopping)

The hydrogel polymer was cut into 5 cm wide and 5 cm long pieces, and pulverized using a screw-type chopper (meat chopper) equipped with a porous plate including numerous holes. At this time, the rotational speed of the screw-type chopper was 250 rpm, and the hole size of the porous plate was 10 mm.

(Drying)

1,000 g of the pulverized polymer was input to a ventilated belt-type dryer including a porous plate capable of vertically transferring air flow. 180° C. hot air at was flowed from the bottom to the top for 15 minutes so that the moisture content of the dried product became approximately 2%, and then was flowed from the top to the bottom for another 15 minutes to uniformly dry the polymer and prepare a dried base resin powder.

(Pulverization/Classification)

The dried base resin powder was ground with a grinder (GRAN-U-LIZERM, MPE) and then classified through a standard mesh sieve of ASTM standards to obtain a super absorbent polymer powder having a size of 150 to 850 μm.

(Surface Crosslinking Step)

Next, a surface crosslinking agent aqueous solution including 6 g of water, 3 g of methanol, 0.05 g of ethylene glycol diglycidyl ether (EJ-1030S), and 0.5 g of aluminum sulfate per 100 g of the super absorbent polymer was sprayed, stirred at room temperature, and mixed to evenly distribute the surface crosslinking solution on the super absorbent polymer powder. Subsequently, the super absorbent polymer powder mixed with the surface crosslinking solution was placed in a surface crosslinking reactor, and a surface crosslinking reaction was performed. In the surface crosslinking reactor, the super absorbent polymer powder was subjected to a surface crosslinking reaction at about 140° C. for 40 minutes to obtain a surface crosslinked super absorbent polymer.

After the surface crosslinking process, a super absorbent polymer having a particle size of 150 μm to 850 μm was prepared by classifying through a standard mesh sieve according to ASTM standards.

Comparative Example 2

Steps 1 to 5 were performed in the same manner as in Example 1 to obtain a base resin powder having a size of 150 to 850 μm.

(Surface Crosslinking Step)

Next, a surface crosslinking agent aqueous solution including 5 g of water, 6 g of methanol, 0.1 g of ethylene glycol diglycidyl ether (EJ-1030S), 0.1 g of propylene glycol, 0.4 g of aluminum sulfate, 0.03 g of sucrose stearate, and 0.1 g of silica particles (Aerosil 200) per 100 g of the base resin powder was sprayed, stirred at room temperature, and mixed to evenly distribute the surface crosslinking solution on the super absorbent polymer powder. Thereafter, a surface crosslinking reaction was performed in the same manner as in Example 1 to obtain a surface crosslinked super absorbent polymer.

Comparative Example 3

(Step 1: Polymer Preparation Step)

A polymer was prepared using the same method as in Example 1.

(Steps 2 and 3: Micronization and Neutralization Steps)

In steps 2 and 3 of Example 1, instead of using a high-speed rotary chopper (F-150/Karl Schnell), the hydrogel polymer prepared in step 1 was cut into 5 cm wide and 5 cm long pieces, and pulverized using a screw-type chopper (meat chopper) equipped with a porous plate including numerous holes. At this time, the rotational speed of the screw-type chopper was 250 rpm, and the hole size of the porous plate was 10 mm.

Thereafter, drying, pulverization, classification, and surface crosslinking steps were performed in the same manner as in Example 1 to prepare a super absorbent polymer (moisture content: 1.8%) having a particle size of 150 μm to 850 μm.

Comparative Example 4

(Step 1: Polymer Preparation Step)

A polymer was prepared using the same method as in Example 1.

(Steps 2 and 3: Micronization and Neutralization Steps)

100 g of a 0.45 wt % aqueous solution of glycerol monolaurate (GML) was input to 5,000 g of the polymer obtained in Step 1. Thereafter, the resulting polymer was pushed through a porous plate with multiple 15 mm holes at a rotational speed of 1,500 rpm using a high-speed rotary chopper (F-150/Karl Schnell) equipped inside a cylindrical grinder to perform a micronization process.

Thereafter, the recovered hydrogel polymer was further pushed three times through a porous plate having multiple 10 mm holes at a rotational speed of 250 rpm using a screw-type extruder equipped inside the cylindrical grinder to perform a pulverization process. In each step of the screw-type extruder, 1383 g of a 50% NaOH aqueous solution (Step 3: neutralization stage) was input to neutralize a portion of the acidic groups of the polymer, and then 100 g of fine particles (additional additive input step) and 157 g of a 10% $Na_2SO_4$ aqueous solution (additional additive input step) were each added to prepare hydrous super absorbent polymer particles (=micronized and neutralized polymer).

Thereafter, the drying, pulverization, and classification steps were performed in the same manner as in Example 1.

(Surface Crosslinking Step)

Next, a surface crosslinking agent aqueous solution including 5 g of water, 6 g of methanol, 0.1 g of ethylene glycol diglycidyl ether (EJ-10305), 0.1 g of propylene glycol, 0.1 g of aluminum sulfate, 0.2 g of sucrose stearate, and 0.05 g of silica particles (Aerosil 200) per 100 g of the base resin powder was sprayed, stirred at room temperature, and mixed to evenly distribute the surface crosslinking solution on the super absorbent polymer powder. Thereafter, a surface crosslinking reaction was performed in the same manner as in Example 1 to obtain a surface crosslinked super absorbent polymer.

Experimental Example 1

The diffusion coefficient ($D_{Sap}$) of the super absorbent polymers (SAPs) prepared in the examples and comparative examples was measured by the following method.

① Step 1

The SAP of Example 1 was filled to a height of 5 cm in a 5 mm NMR tube. Next, ethanol solvent was input to the 5 mm NMR tube to a height of 6 cm and shaken for 30 minutes.

② Step 2

After shaking for 30 minutes, a $^1$H DOSY NMR experiment was performed under the following conditions.

<Conditions> d1=5, ns=1, pulse=ledbpgp2s, gpz6=1-17, p30=500us, d20=0.05, o1p=5, sw=100 ppm

③ Step 3

The $^1$H DOSY data obtained by performing a $^1$H DOSY NMR experiment was fitted to the intensity value change plot by the gradient of the ethanol peak using the fitting software, Dynamics Center v2.5.6, to derive the diffusion coefficient ($D_{Sap}$) value of ethanol in the super absorbent polymer of Example 1.

The same experiment was performed for Examples 2 and 3 and Comparative Examples 1 to 3 to derive the diffusion coefficient ($D_{Sap}$) value of ethanol in each super absorbent polymer.

The results are shown in Table 1 below.

In addition, as a reference example, in order to derive the diffusion coefficient ($D_E$) of ethanol itself, an experiment was performed in the same manner as the method for measuring $D_{Sap}$, except that in step 1 of the method for measuring $D_{Sap}$, an SAP as a sample was not filled and the ethanol solvent was input to a 5 mm NMR tube to a height of 6 cm.

The results are shown in Table 1 below.

TABLE 1

| | Diffusion coefficient ($D_{Sap}$ or $D_E$) | ($D_{Sap}/D_E$) × 100 (%) |
|---|---|---|
| Example 1 | 7.2 $m^2/s$ | 82.7 |
| Example 2 | 7.5 $m^2/s$ | 86.3 |
| Example 3 | 7.8 $m^2/s$ | 90.2 |
| Example 4 | 8.0 $m^2/s$ | 92.4 |
| Comparative Example 1 | 8.1 $m^2/s$ | 92.9 |
| Comparative Example 2 | 8.2 $m^2/s$ | 94.4 |
| Comparative Example 3 | 8.3 $m^2/s$ | 95.5 |
| Comparative Example 4 | 8.5 $m^2/s$ | 97.8 |
| Reference Example | 8.7 $m^2/s$ | 100 |

Experimental Example 2

In addition, the convexity and CE diameter of the super absorbent polymer particles manufactured in the examples and comparative examples were measured using the following methods, and are shown in Table 2 below.

Unless otherwise specified, all of the following property evaluations were performed under constant temperature and humidity (23±1° C., relative humidity 50±10%), and saline or brine refers to a 0.9 wt % sodium chloride (NaCl) aqueous solution.

After the sample to be measured was left under constant temperature and humidity conditions for 24 hours, each property was evaluated.

For the super absorbent polymers of the examples and comparative examples, the convexity and CE diameter were measured using Morphologi 4 from Malvern Panalytical by the following method.

1) Sample preparation: 1 g of a particle sample of the super absorbent polymer to be measured was prepared. At this time, 1 g of a sample was prepared by classifying the super absorbent polymer using a particle classifier from Retsch at a 1.0 amplitude for 10 minutes to separate individual particles with a particle diameter of 300 μm to 600 μm without damaging the particles. The setting values of the sample dispersion unit at this time are as shown in FIG. 3.

2) Image acquisition: After setting the prepared sample on the stage inside the equipment, images of individual particles are obtained by scanning at 2.5× magnification. At this time, the illumination setting value and the optics selection setting value were as shown in FIGS. 4 and 5, respectively.

3) Image processing: For the acquired images, a 2D image of each 3D particle, CE diameter, shortest diameter, longest diameter, actual particle circumference, and convex hull perimeter were measured. At this time, the scan area setting value was as shown in FIG. 6, and measured without setting the filtering value for the particle.

Among these, the average convexity value calculated by Equation 3 and the CE diameter are shown in Table 3 below.

TABLE 2

| | Average convexity | Average CE diameter (μm) |
|---|---|---|
| Example 1 | 0.91 | 301 |
| Example 2 | 0.88 | 284 |
| Example 3 | 0.87 | 245 |
| Example 4 | 0.92 | 303 |
| Comparative Example 1 | 0.95 | 327 |
| Comparative Example 2 | 0.94 | 325 |
| Comparative Example 3 | 0.93 | 450 |
| Comparative Example 4 | 0.95 | 326 |

As can be confirmed in Table 2 above, in the case of the super absorbent polymer of the examples in which the diffusion coefficient of the super absorbent polymer satisfies Equation 1, it was confirmed that the average convexity value was 0.92 or less. In addition, it was confirmed that the average CE diameter value was 220 μm to 400 μm. In the case of the super absorbent polymer of the comparative examples, it was confirmed that some average CE diameter values was within the range of 220 μm to 400 μm, but all of the average convexity value was greater than 0.92.

Experimental Example 3

In addition, the properties of the super absorbent polymers prepared in the examples and comparative examples were evaluated using the following methods and are shown in Table 3 below.

Unless otherwise specified, all of the following property evaluations were performed under constant temperature and humidity (23±1° C., relative humidity 50±10%), and saline or brine refers to a 0.9 wt % sodium chloride (NaCl) aqueous solution.

After the sample to be measured was left under constant temperature and humidity conditions for 24 hours, each property was evaluated.

(1) Centrifuge Retention Capacity (CRC, g/g)

The centrifuge retention capacity of the super absorbent polymers of the examples and comparative examples by the absorption rate under no-load was measured according to the European Disposables and Nonwovens Association (EDANA) standard EDANA WSP 241.3.

Measurements were performed at a temperature of 23±2° C. and a relative humidity of 45±15% as described in EDANA WSP 241.0.

Specifically, $W_0$ (g) (about 0.2 g) of the super absorbent polymer obtained through each of the examples and comparative examples was uniformly placed in a nonwoven bag, sealed, and then immersed in saline (0.9 wt %) at room temperature. After 30 minutes, water was removed from the bag using a centrifuge at 250 G for 3 minutes, and the mass $W_2$ (g) of the bag was measured. In addition, the same operation was performed without using the resin, and the mass $W_1$ (g) at that time was measured.

Using each mass obtained, CRC (g/g) was calculated according to the following Mathematical Formula 1.

$$CRC(g/g)=\{[W_2(g)-W_1(g)]/W_0(g)\}-1 \quad \text{[Mathematical formula 1]}$$

The measurement was repeated five times, and the average and standard deviation were calculated.

The results are shown in Table 3 below.

(2) Absorbency Under Pressure (AUP, g/g)

The absorbency under pressure of the super absorbent polymers of the examples and comparative examples at 0.3 psi was measured according to the EDANA method WSP 242.3.

Measurements were performed at a temperature of 23±2° C. and a relative humidity of 45±15% as described in EDANA WSP 242.0.

Specifically, a 400 mesh stainless steel wire mesh was installed on the bottom of a plastic cylinder with an inner diameter of 25 mm. Under the conditions of room temperature and 50% humidity, $W_0$ (g) (0.9 g) of the super absorbent polymer was uniformly sprayed on the wire mesh, and a piston capable of uniformly applying a load of 0.3 psi was placed thereon with an outer diameter slightly smaller than 25 mm so that there was no gap with the inner wall of the cylinder and no obstructed up-and-down movement. At this time, the weight $W_3$ (g) of the device was measured.

A glass filter with a diameter of 90 mm and a thickness of 5 mm was placed on the inside of a Petri dish with a diameter of 150 mm, and saline composed of 0.9 wt % sodium chloride was placed so that it was at the same level as the upper surface of the glass filter. A sheet of filter paper with a diameter of 90 mm was placed thereon. The measuring device was placed on the filter paper and the liquid was absorbed under a load for 1 hour. After 1 hour, the measuring device was lifted and its weight $W_4$ (g) was measured.

Using each mass obtained, the absorbency under pressure (g/g) was calculated according to the following Mathematical Formula 2.

$$AUP(g/g)=[W_4(g)-W_3(g)]/W_0(g) \quad \text{[Mathematical Formula 2]}$$

The measurement was repeated five times, and the average and standard deviation were calculated.

The results are shown in Table 3 below.

(3) Effective Absorption Capacity (EFFC)

The measured retention capacity and absorbency under pressure were applied to Equation 4 below to calculate the effective absorption capacity (EFFC).

$$EFFC=(CRC+AUP)/2 \quad \text{[Equation 4]}$$

In Equation 4, CRC represents a centrifuge retention capacity (units: g/g) as measured according to the EDANA method WSP 241.3, and AUP represents an absorbency under pressure (units: g/g) as measured under 0.3 psi according to the EDANA method WSP 242.3.

The results are shown in Table 3 below.

(4) Absorption Rate (Vortex Time)

The absorption rate (vortex time) of the super absorbent polymer of the examples and comparative examples was measured by the following method.

① First, 50 mL of 0.9% brine was input to a 100 mL beaker with a flat bottom using a 100 mL mass cylinder.

② Next, the beaker was placed in the center of the magnetic stirrer, and a circular magnetic bar (diameter 30 mm) was placed inside the beaker.

③ Thereafter, the stirrer was operated so that the magnetic bar stirred at 600 rpm, and the lowest part of the vortex created by the stirring was made to touch the top of the magnetic bar.

④ After confirming that the temperature of the brine in the beaker was 24.0° C., 2±0.01 g of the super absorbent polymer sample was input while simultaneously operating a stopwatch, and the time until the vortex disappeared and the liquid surface became completely horizontal was measured in seconds, which was taken as the absorption rate.

The results are shown in Table 3 below.

(5) 1-Minute Absorption Capacity in Water with Electrical Conductivity Value of 110 μS/Cm (EC 110 μS/Cm 1-Minute Absorption Capacity)

1.0 g ($W_5$) of the super absorbent polymer of the examples and comparative examples was placed in a nonwoven bag (18 cm×28 cm) and immersed in 1000 mL of water having an electrical conductivity value of 110 μS/cm at 24° C. for 1 minute. After 1 minute, the bag was taken out of the distilled water and left for 1 minute. Thereafter, the mass of the bag ($W_7$) was measured. In addition, the same operation was performed without using the super absorbent polymer, and then the mass ($W_6$) at that time was measured. Using each mass thus obtained, the absorption capacity (g/g) in water with an electrical conductivity value of 110 μS/cm was calculated according to the following Mathematical Formula 3.

$$\text{Absorption capacity in water with electrical conductivity of 110 μS/cm}=\{[W_7(g)-W_6(g)-W_5(g)]/W_5(g)\} \quad \text{[Mathematical Formula 3]}$$

TABLE 3

| | CRC (g/g) | 0.3AUP (g/g) | EFFC | Vortex time (sec) | 110 μS/cm 1-minute absorption capacity (g/g) |
|---|---|---|---|---|---|
| Example 1 | 34.2 | 32.6 | 33.4 | 28 | 190 |
| Example 2 | 36.9 | 33.5 | 34.2 | 21 | 205 |
| Example 3 | 37.4 | 30.9 | 34.2 | 16 | 215 |
| Example 4 | 35.3 | 33.7 | 34.5 | 29 | 166 |

TABLE 3-continued

| | CRC (g/g) | 0.3AUP (g/g) | EFFC | Vortex time (sec) | 110 μS/cm 1-minute absorption capacity (g/g) |
|---|---|---|---|---|---|
| Comparative Example 1 | 38.1 | 26.5 | 32.3 | 41 | 86 |
| Comparative Example 2 | 37.5 | 32.3 | 34.4 | 36 | 124 |
| Comparative Example 3 | 37.0 | 33.5 | 34.9 | 34 | 138 |
| Comparative Example 4 | 40 | 26.5 | 33.5 | 38 | 90 |

As can be confirmed in Table 3 above, in the case of the super absorbent polymer of the examples in which the diffusion coefficient of the super absorbent polymer satisfies Equation 1, it was confirmed that it is possible to exhibit an excellent balance between physical properties by simultaneously improving absorption performance such as centrifugal retention capacity and absorbency under pressure while improving the absorption rate.

The super absorbent polymer of the present disclosure has an excellent absorption rate and excellent absorption performance such as centrifuge retention capacity and absorbency under pressure by appropriately controlling the numerical value of a diffusion coefficient of ethanol in the SAP to a certain level or lower.

What is claimed is:

1. A polyacrylic acid (salt)-based super absorbent polymer, the polyacrylic acid (salt)-based super absorbent polymer satisfying Equation 1, $$(D_{Sap}/D_E)\times100(\%)\leq92.5(\%) \quad \text{[Equation 1]}$$

wherein, in Equation 1:

$D_{Sap}$ is a diffusion coefficient of ethanol in the polyacrylic acid (salt)-based super absorbent polymer measured by nuclear magnetic resonance (NMR) spectroscopy, and $D_E$ is a diffusion coefficient of pure ethanol as measured by nuclear magnetic resonance spectroscopy;

wherein when the polyacrylic acid (salt)-based super absorbent polymer is swelled in water having an electrical conductivity value of 100 to 130 μS/cm for 1 minute, a maximum capacity of water that the polyacrylic acid (salt)-based super absorbent polymer is able to hold (free swelling capacity) is 170 g/g or more.

2. The polyacrylic acid (salt)-based super absorbent polymer of claim 1, wherein the polyacrylic acid (salt)-based super absorbent polymer satisfies Equation 2:

$$80.0(\%)\leq(D_{Sap}/D_E)\times100(\%) \quad \text{[Equation 2]}$$

3. The polyacrylic acid (salt)-based super absorbent polymer of claim 1, wherein the $D_{Sap}$ is 7.0 $m^2/s$ or more.

4. The polyacrylic acid (salt)-based super absorbent polymer of claim 1, wherein the $D_{Sap}$ is 8.0 $m^2/s$ or less.

5. The polyacrylic acid (salt)-based super absorbent polymer of claim 1, wherein the polyacrylic acid (salt)-based super absorbent polymer has an average convexity value of 0.92 or less for all particles, as calculated using Equation 3:

$$M_c=L_s/L \quad \text{[Equation 3]}$$

wherein, in Equation 3, $M_c$ is convexity, $L_s$ is a length of a perimeter of a polygon of minimal perimeter that surrounds a two-dimensional (2D) image of a three-dimensional (3D) particle to be measured, and L is an actual perimeter length of the 2D image of the 3D particle to be measured.

6. The polyacrylic acid (salt)-based super absorbent polymer of claim 1, wherein the polyacrylic acid (salt)-based super absorbent polymer has a centrifuge retention capacity (CRC) of 33 g/g or more, measured according to the EDANA method WSP 241.3.

7. The polyacrylic acid (salt)-based super absorbent polymer of claim 1, wherein the polyacrylic acid (salt)-based super absorbent polymer has an absorbency under pressure (AUP) of 28 g/g or more, measured under 0.3 psi according to the EDANA method WSP 242.3.

8. The polyacrylic acid (salt)-based super absorbent polymer of claim 1, wherein the polyacrylic acid (salt)-based super absorbent polymer has an average circle equivalent (CE) diameter of 220 μm to 400 μm.

9. The polyacrylic acid (salt)-based super absorbent polymer of claim 1, wherein the polyacrylic acid (salt)-based super absorbent polymer has an effective absorption capacity (EFFC) of 30 g/g or more, calculated by Equation 4:

$$EFFC=(CRC+AUP)/2 \quad \text{[Equation 4]}$$

wherein, in Equation 4,

CRC is a centrifuge retention capacity (units: g/g) measured according to the EDANA method WSP 241.3, and AUP is an absorbency under pressure (units: g/g) measured under 0.3 psi according to the EDANA method WSP 242.3.

10. The polyacrylic acid (salt)-based super absorbent polymer of claim 1, wherein the polyacrylic acid (salt)-based super absorbent polymer has an absorption rate (vortex time) of 40 seconds or less, measured by a vortex measurement method at 24.0° C.

* * * * *